US012801657B2

(12) United States Patent
Zhang

(10) Patent No.: US 12,801,657 B2
(45) Date of Patent: Nov. 17, 2026

(54) SEARCH PROCESSING METHOD AND APPARATUS, DEVICE, MEDIUM, AND PROGRAM PRODUCT

(71) Applicant: Tencent Technology (Shenzhen) Company Limited, Shenzhen (CN)

(72) Inventor: Hong Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 18/990,197

(22) Filed: Dec. 20, 2024

(65) Prior Publication Data

US 2025/0124073 A1 Apr. 17, 2025

Related U.S. Application Data

(63) Continuation of application No. 18/202,795, filed on May 26, 2023, now Pat. No. 12,210,561, which is a continuation of application No. PCT/CN2022/113248, filed on Aug. 18, 2022.

(30) Foreign Application Priority Data

Sep. 8, 2021 (CN) ......................... 202111052525.6

(51) Int. Cl.
*G06F 16/48* (2019.01)
*G06F 16/438* (2019.01)

(52) U.S. Cl.
CPC ............ *G06F 16/48* (2019.01); *G06F 16/438* (2019.01)

(58) Field of Classification Search
CPC ............................... G06F 16/48; G06F 16/438
See application file for complete search history.

(56) References Cited

U.S. PATENT DOCUMENTS

2015/0019586 A1* 1/2015 Raichelgauz .......... H04H 60/66
707/769
2017/0103072 A1* 4/2017 Yuen ................... G06F 16/5846
2017/0185236 A1* 6/2017 Yang ....................... H04L 51/02
2018/0054405 A1* 2/2018 Ritch ....................... G06F 16/48
(Continued)

FOREIGN PATENT DOCUMENTS

CN 105786969 A 7/2016
CN 107273448 A 10/2017
(Continued)

*Primary Examiner* — Jensen Hu

(74) *Attorney, Agent, or Firm* — Morgan, Lewis & Bockius LLP

(57) ABSTRACT

The present application provides a search processing method performed by a computer device. The method includes: receiving a search operation on multimedia data displayed in a conversation service interface; in response to the search operation: initiating a search request, the search request including a keyword derived from the multimedia data; and displaying a search result interface, the search result interface including a tag associated with the keyword and a search result associated with the target tag; and in response to a user selection of the search result, displaying the search result and the multimedia data in the conversation service interface, wherein the search result and the multimedia data are to be shared with a second user. Search efficiency for the multimedia data can be improved.

20 Claims, 19 Drawing Sheets

(56) References Cited

U.S. PATENT DOCUMENTS

| | | | | |
|---|---|---|---|---|
| 2018/0173725 | A1* | 6/2018 | De Guerre | G06F 16/5866 |
| 2018/0367484 | A1* | 12/2018 | Rodriguez | H04L 67/75 |
| 2020/0034033 | A1* | 1/2020 | Chaudhri | G06F 3/04883 |
| 2021/0397645 | A1* | 12/2021 | Wang | H04L 51/046 |

FOREIGN PATENT DOCUMENTS

| | | | |
|---|---|---|---|
| CN | 110866796 | A | 3/2020 |
| CN | 112445960 | A | 3/2021 |

* cited by examiner

SEARCH PROCESSING METHOD AND APPARATUS, DEVICE, MEDIUM, AND PROGRAM PRODUCT

CROSS-REFERENCE TO RELATED APPLICATIONS

This application is a continuation application of U.S. patent application Ser. No. 18/202,795, entitled "SEARCH PROCESSING METHOD AND APPARATUS, DEVICE, MEDIUM, AND PROGRAM PRODUCT" filed on May 26, 2023, which is a continuation application of PCT Patent Application No. PCT/CN2022/113248, entitled "SEARCH PROCESSING METHOD AND APPARATUS, DEVICE, MEDIUM, AND PROGRAM PRODUCT" filed on Aug. 18, 2022, which claims priority to Chinese Patent Application No. 2021110525256, entitled "SEARCH PROCESSING METHOD AND APPARATUS, DEVICE, MEDIUM, AND PROGRAM PRODUCT" filed with the China National Intellectual Property Administration on Sep. 8, 2021, the entirety of which is incorporated by reference in its entirety.

FIELD OF THE TECHNOLOGY

This application relates to the field of computer technologies, and in particular, to application-program-based information search technology.

BACKGROUND OF THE DISCLOSURE

In many application scenarios (for example, a social conversation scenario, an on-line shopping scenario, or an entertainment scenario), a user may have a requirement of searching for multimedia data in a current application scenario. For example, in a scenario in which a social conversation is made by using a social application program, the user may have a requirement of searching for multimedia data in a social conversation interface.

It has been found through practice that in the related art, the multimedia data is required to be manually copied to a search engine with a search function, to search for the multimedia data. For example, if the multimedia data is an image, when having a requirement of searching for the image in the social conversation interface, the user needs to copy the image to the search engine for searching. This results in a long search path and low efficiency of searching for the multimedia data and viewing the multimedia data. Therefore, how to improve search efficiency of multimedia data has become a hot topic of research.

SUMMARY

Embodiments of this application provide a search processing method and apparatus, a device, a medium, and a program product, which can improve search efficiency for multimedia data.

In an aspect, an embodiment of this application provides a search processing method, performed by a computer device. The method includes:

- displaying a resource search interface in response to a search operation on multimedia data in a service interface, the resource search interface comprising a first region and a second region;
- displaying, in the first region, at least one search tag associated with the multimedia data; and
- displaying, in the second region in response to a selection operation on a target tag of the at least one search tag displayed in the first region, a search result associated with the target tag.

In another aspect, this application provides a computer device. The computer device includes:

- a processor, configured to load and execute a computer program; and
- a computer-readable storage medium storing the computer program. The computer program, when executed by the processor, causes the computer device to implement the foregoing search processing method.

In an aspect, this application provides a non-transitory computer-readable storage medium. The computer-readable storage medium stores a computer program. The computer program, when executed by the processor, causes the computer device to implement the foregoing search processing method.

In an aspect, this application provides a computer program product or computer program. The computer program product or computer program includes computer instructions. The computer instructions are stored in a computer-readable storage medium. A processor of a computer device reads the computer instructions from the computer-readable storage medium. The computer instructions are executed by the processor to implement the foregoing search processing method.

In this embodiment of this application, the search operation may be triggered for the multimedia data on the service interface, and the resource search interface may be displayed. The at least one search tag associated with the multimedia data and the search result associated with the target tag are displayed on the resource search interface. In the foregoing solution, the search operation may be directly triggered for the multimedia data displayed on the service interface to obtain the search tag associated with the multimedia data and the search result associated with the target tag. This simplifies a search process of the multimedia data, shortens a search path, and improves the search efficiency.

DESCRIPTION OF EMBODIMENTS

The technical solutions in the embodiments of this application will be described clearly and completely below with reference to the drawings in the embodiments of this application. Clearly, the described embodiments are not all but only some embodiments of this application. All other embodiments obtained by a person of ordinary skill in the art based on the embodiments of this application without creative work shall fall within the protection scope of this application.

Figure 1A:
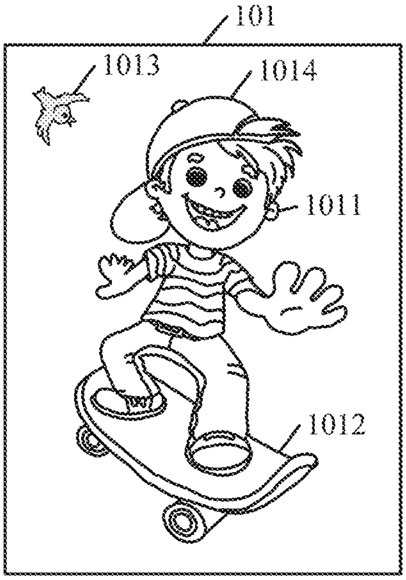
FIG. 1*a* is a schematic diagram of an image according to an embodiment of this application.

The embodiments of this application involve multimedia data. The multimedia data may include but is not limited to an animation, audio, an image, a text, a video, a rich text, or the like. The following uses an example in which the multimedia data is an image for description, unless particularly noted. The image generally includes one or more image elements. FIG. 1*a* is an exemplary schematic diagram of the image and the image element in the image. As shown in FIG. 1*a*, an image 101 includes a person 1011, a skateboard 1012, a bird 1013, and a hat 1014. In the embodiments of this application, each object in the image 101 may be referred to as an image element. That is, image elements in the image 101 are the person 1011, the skateboard 1012, the bird 1013, and the hat 1014. Image recognition may be performed on the image to obtain image content, image attribute information, and the like of the image. The image may be analyzed better based on the image content and the image attribute information of the image. The image content may include the image element in the image, a meaning of the image (for example, a meaning of the image shown in FIG. 1*a* is a skateboarding boy), or the like. The image attribute information may include information of pixels, a size, a source, an address, and the like of the image.

The multimedia data (for example, an image) may be displayed on a service interface provided by a target application program. The target application program can obtain the multimedia data, and supports triggering of data search. An application program is a computer program completing one or more specific functions. The application program may be classified according to different dimensions (for example, an operation mode or a function of the application program) to obtain types of the same application program in different dimensions. For example, (1) when classified according to the operation mode of the application program, the application may include but is not limited to a client installed in a terminal, an applet available without download and installation, a web application program opened through a browser, and the like. (2) When classified according to a function type of the application program, the application program may include but is not limited to an instant messaging (IM) application program, a content interaction application program, and the like. The IM application program is an application program for Internet-based instant message exchange and social interaction. The IM application program may include but is not limited to a social application program with a communication function, a map application program with a social interaction function, a game application program, and the like. The content interaction application program is an application program capable of implementing content interaction, and may be, for example, on-line banking, a sharing platform, a personal space, news, or another application program. A type of the target application program is not limited in the embodiments of this application.

In the embodiments of this application, searching may be directly performed on the multimedia data displayed on the service interface of the target application program to obtain a search result associated with the multimedia data. For example, searching is performed on an image (that is, the multimedia data) displayed on a social conversation interface (that is, an interface for displaying a social conversation message sent by a user participating in a social conversation) in the target application program (for example, an IM application program) to obtain a search result associated with the image. The search result may specifically be associated with one or more image elements in the image, for example, an image element "puppy" in the image. In this case, the search result associated with the image may include the found image including the image element "puppy". Based on the descriptions of the above related content, the embodiments of this application propose a search processing solution. In the search processing solution, a search operation is performed on multimedia data displayed on a service interface, and one or more search tags associated with the multimedia data and a search result associated with a target tag are displayed on a resource search interface. In this way, the search operation may be directly performed on the multimedia data displayed on the service interface. This simplifies a search process of the multimedia data, shortens a search path, and improves search efficiency.

The foregoing search processing solution may be performed by a target terminal, specifically performed by a target application program run in the target terminal. The target terminal may be any terminal. The terminal may include but is not limited to a device such as a smartphone (for example, an Android mobile phone or an iOS mobile phone), a tablet computer, a personal computer, a portable personal computer, a mobile Internet device (MID), a smart television, an in-vehicle device, or a head-mounted device. A type of the terminal is not limited in the embodiments of this application.

Figure 1B:
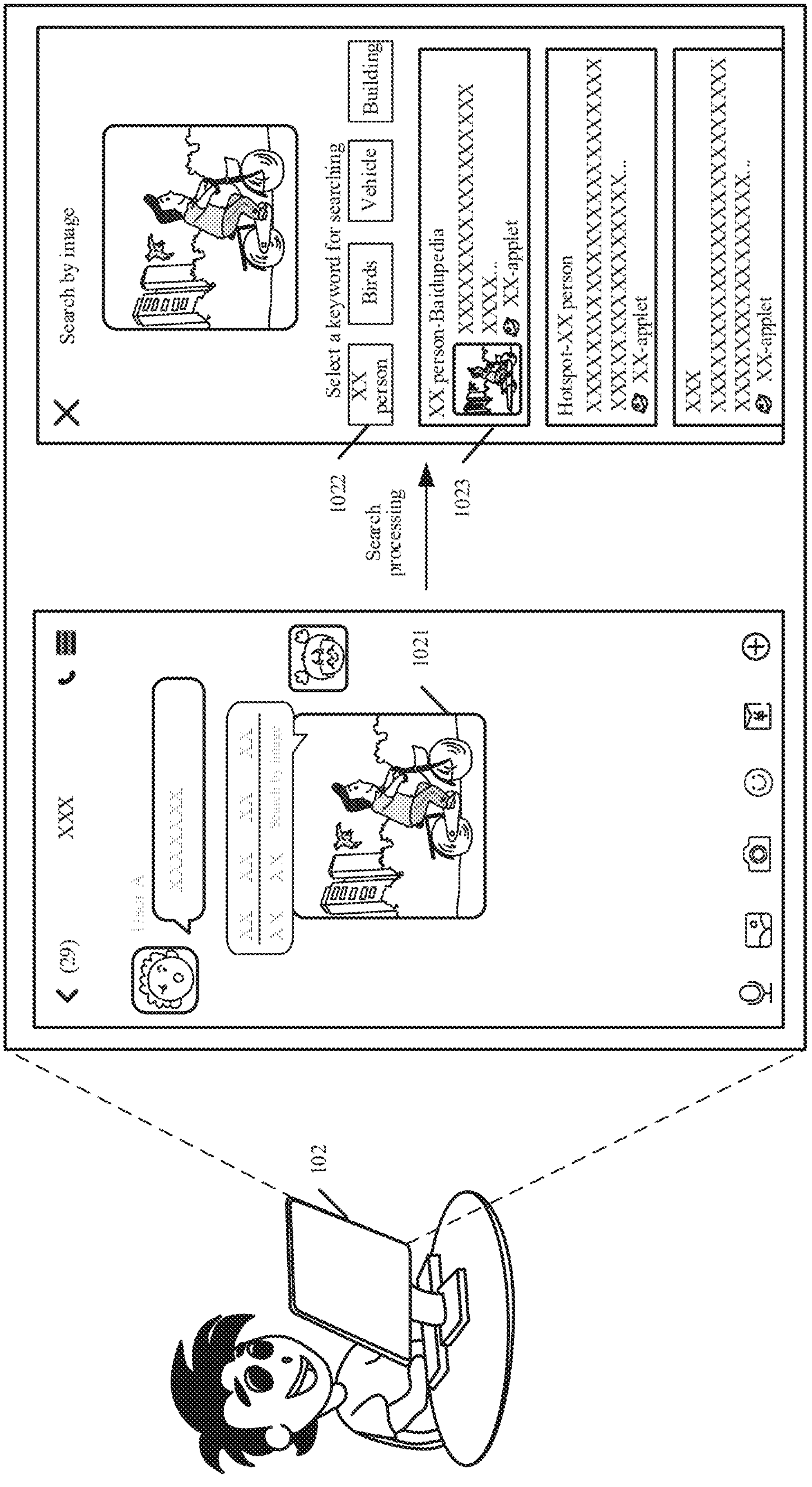
FIG. 1*b* is a schematic diagram of a search processing scenario according to an embodiment of this application.

FIG. 1*b* is an exemplary schematic diagram of a search processing scenario. As shown in FIG. 1*b*, it is assumed that the target terminal is a terminal 102 used by a target user (for example, any user) with an image (that is, multimedia data) search requirement, a social application program is run in the terminal 102, and the target user may participate in a social conversation through the social application program run in the terminal 102. Specifically, the target user may send or read a social conversation message through any social conversation interface in the social application program, to participate in the social conversation. The social conversation interface includes a social conversation message flow. The social conversation message flow includes a social conversation message sent by at least one user participating in the social conversation. If the social conversation interface includes multimedia data displayed in a social conversation message form, a resource search interface may be displayed in response to a search operation for the multimedia data. The resource search interface includes one or more search tags (for example, a search tag 1022) associated with the multimedia data and a search result associated with a target tag (for example, a search result 1023 associated with the search tag 1022) in the one or more search tags. Based on the above descriptions, it can be seen that, in the embodiments of this application, both the interfaces for displaying the multimedia data and the search result belong to the social application program. That is, application program switching and jumping (for example, manually copying an image from the social application program to a search application for searching) are avoided in a search process of the multimedia data. This simplifies the search process of the multimedia data, shortens a search path, improves search efficiency, and realizes a search function of the social application program.

The above uses an example in which the target application program is the social application program and the service interface is the social conversation interface in the social application program for description. However, in a practical application scenario, the service interface may alternatively be a social public service interface, for example, a trends interface or Moments, in the social application program. The multimedia data may be a piece of social information in a social information flow in the social public service interface. The social information flow may be a feed flow, an information flow that is continuously updated and presents social information to the user. Alternatively, the service interface may be a preview interface of the multimedia data. The preview interface may be used for displaying details of the multimedia data, or the like. Types and styles of the target application program and the service interface in the target application program are not limited in the embodiments of this application.

Based on the foregoing search processing solution, an embodiment of this application proposes a more specific search processing method. The following describes the search processing method proposed in this embodiment of this application in detail with reference to the drawings.

Figure 2:
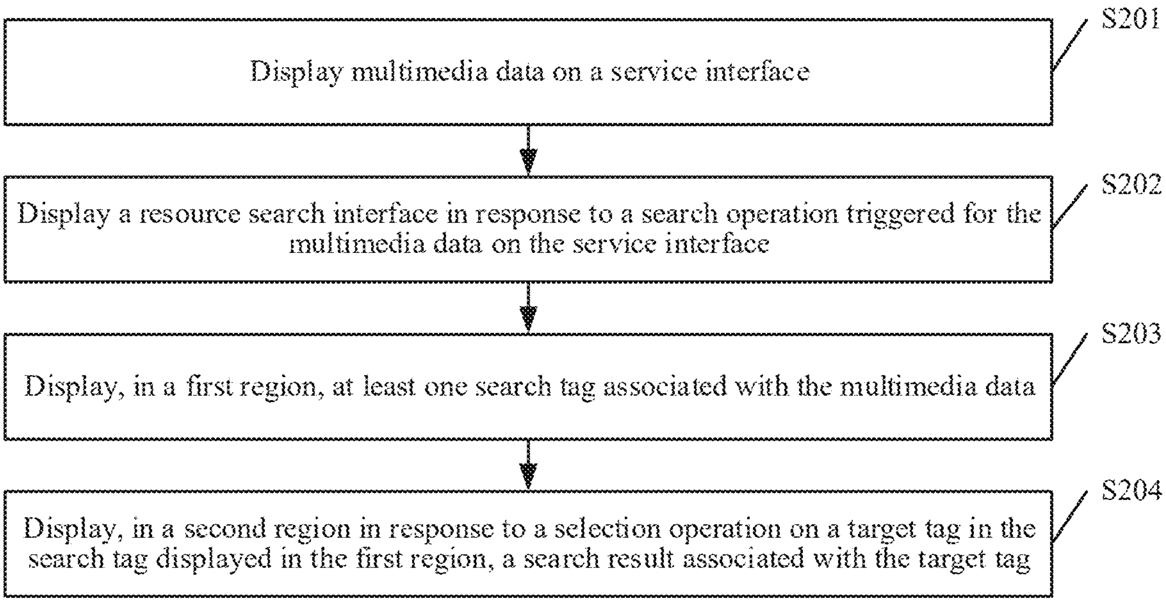
FIG. 2 is a schematic flowchart of a search processing method according to an embodiment of this application.

FIG. 2 is a schematic flowchart of a search processing method according to an exemplary embodiment of this application. The search processing method may be performed by a target terminal (for example, any terminal). The search processing method may include but is not limited to steps S201 to S204:

S201: Display multimedia data on a service interface.

When a target user opens and uses a target application program (for example, a social application program), the target terminal may display the service interface in the target application program. According to different types of target application programs, the target application programs include different service interfaces. Alternatively, a same target application program includes different service interfaces. For example, if the target application program is the social application program, a service interface of the social application program may include a social conversation interface for implementing a social conversation, a social public service interface for displaying a social information flow (for example, a feeds flow), a preview interface for previewing the multimedia data, an information setting interface for setting user information (for example, information of a user account, a user nickname, or a user portrait) of the target user (for example, a user of the target terminal), . . . , and the like. For case of description, an example in which the application program is the social application program and the service interface of the social application program is respectively the social conversation interface for implementing the social conversation and the preview interface for previewing the multimedia data is used for description in this embodiment of this application. In this embodiment of this application, the preview interface for previewing the multimedia data is referred to as a content display interface.

The above describes several service interfaces of the social application program. The following briefly describes an implementation of displaying the multimedia data on each service interface.

Figure 3A:
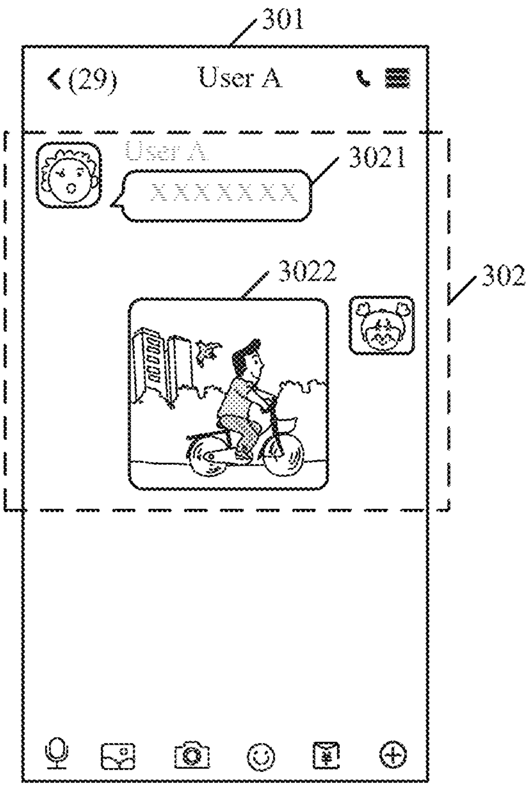
FIG. 3*a* is a schematic diagram of a thumbnail of an image according to an embodiment of this application.

(1) The service interface is the social conversation interface. The social conversation interface is used for displaying a social conversation message flow of a plurality of users participating in the social conversation. In this case, when the multimedia data is displayed on the social conversation interface in a social conversation message form, a resource search interface may be displayed in response to a search operation triggered for the multimedia data on the social conversation interface. Specifically, the multimedia data includes general information of the multimedia data. That is, the general information of the multimedia data may be displayed on the social conversation interface (for example, the service interface). The following describes the general information of the multimedia data with examples. For example, the multimedia data is a text. The text includes a document icon of the text, that is, general information of the text is the document icon, and in this case, the text may be displayed on the social conversation interface in a document icon form. Alternatively, the text includes summary information (for example, title information or key information extracted from the text) of the text, that is, general information of the text is the summary information, and in this case, the text may be displayed on the social conversation interface in a summary information form. The text is a written representation form. The text may include one or more characters. The one or more characters form a character string. The character may include at least one of the following: a Chinese character (that is, a Chinese character), an English character (that is, a letter), a number, and a punctuation mark (for example, a comma ",", a full stop ".", or square brackets "[ ]"). For another example, the multimedia data is an image. The image includes a thumbnail of the image, that is, general information of the image is the thumbnail, and in this case, the image may be displayed on the social conversation interface in a thumbnail form. FIG. 3*a* is an exemplary schematic diagram of displaying the thumbnail of the image on the social conversation interface of the social application program. As shown in FIG. 3*a*, the social conversation interface 301 is displayed in the social application program. The social conversation interface 301 is a conversation interface for bearing a social conversation between a user A and the target user. The social conversation interface 301 includes a social conversation message flow 302. The social conversation message flow 302 includes a social conversation message 3021 and a social conversation message 3022. The social conversation message 3022 is a thumbnail of an image. The thumbnail may be understood as being obtained by scaling down the image.

Figure 3B:
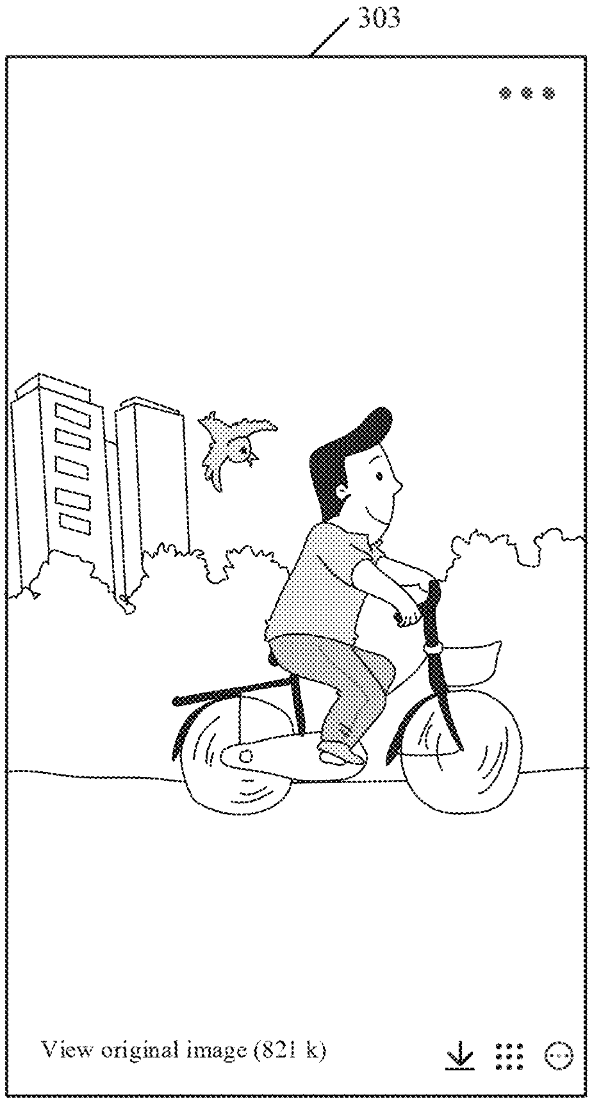
FIG. 3*b* is a schematic diagram of displaying an image on full screen on a content display interface according to an embodiment of this application.

(2) The service interface is the content display interface. The content display interface may be referred to as the preview interface. When the service interface of the social application program is the preview interface of the multimedia data, a resource search interface may be displayed in response to a search operation triggered for the multimedia data on the social conversation interface. Specifically, the multimedia data includes data content of the multimedia data. That is, the data content of the multimedia data is displayed on the content display interface. The following describes the data content of the multimedia data with examples. For example, the multimedia data is a text. The text includes a character string, that is, data content of the text is the character string in the text, and in this case, all or part of the character string in the text is displayed on the content display interface. That is, the content display interface is used for displaying text details of the text. For another example, the multimedia data is an image. The image may be displayed on full screen. In this case, data content of the image is the image displayed on full screen. That is, the image may be displayed on full screen on the content display interface. FIG. 3*b* is an exemplary schematic diagram of displaying the image on full screen on the content display interface. As shown in FIG. 3*b*, a content display interface 303 is displayed in the social application program. The image is displayed on full screen on the content display interface 303. That is, a display size of the image matches an interface size of the content display interface (for example, the sizes are the same, or a difference between the sizes is less than a preset difference). In this case, the data content of the image may include the image displayed on full screen.

Figure 3C:
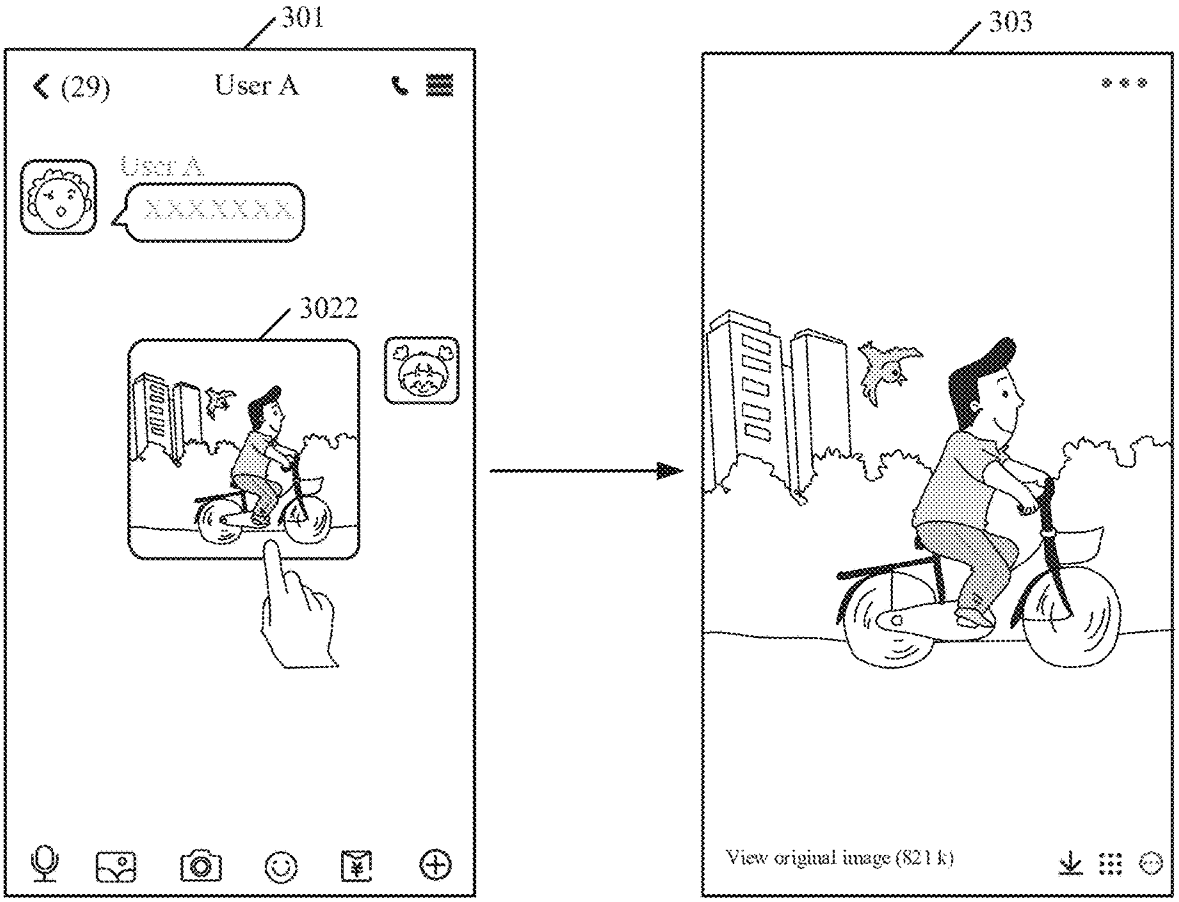
FIG. 3*c* is a schematic diagram of triggering a content display interface to be displayed through a social conversation interface according to an embodiment of this application.

(1) In this embodiment of this application, the content display interface of the multimedia data is triggered to be displayed based on the social conversation interface of the social application program. In other words, the social conversation message 3022 on the social conversation interface 301 shown in FIG. 3*a* may be triggered to trigger the content display interface 303 shown in FIG. 3*b* to be displayed. An image obtained by scaling up the image in the social conversation message 3022 is displayed on the content display interface 303. FIG. 3*c* is a schematic diagram of an interface process in the foregoing implementation. As shown in FIG. 3*c*, after the social conversation message 3022 is triggered on the social conversation interface 301, the content display interface 303 is displayed. A trigger operation for the social conversation message 3022 on the social conversation interface 301 may include but is not limited to a gesture operation (for example, tapping, dragging, or touching and holding), a voice input operation, a vibration operation (for example, shaking a mobile phone), and the like. In addition, the content display interface may alternatively be triggered to be displayed based on another service interface in the social application program, for example, the social public service interface (for example, Moments) in the social application program. When the multimedia data is displayed on the social public service interface (for example, the multimedia data is displayed in a social message flow form), the search operation for the multimedia data may be directly triggered on the social public service interface, or the content display interface is triggered to be displayed on the social public service interface, thereby triggering the search operation for the multimedia data on the content display interface.

(2) The social conversation interface mentioned in this embodiment of this application may include a conversation interface between the target user and another user (for example, a user who is a friend, a colleague, or a stranger for the target user). The social conversation interface may further include a conversation interface between the target user and the social application program. In other words, an intelligent robot may be deployed in the social application program. During a social conversation between the target user and the intelligent robot, the target user may send the multimedia data, and the intelligent robot may receive the multimedia data sent by the target user, and return a search tag and a search result that are associated with the multimedia data. Certainly, the intelligent robot may alternatively be deployed on a social conversation interface between the target user and another user, and during a social conversation, the intelligent robot is aroused to perform search on the social conversation interface. (3) The foregoing implementations are described by using an example in which the target application program is the social application program and the service interface is an interface in the social application program. However, it may be understood that the target application program may be another type of target application program. For example, the target application program is a map application program, a game application program, or a camera application program. Accordingly, the service interface is an interface (for example, a map display interface) in the map application program, or the like. A type of the target application program and a style of the service interface are not limited in this embodiment of this application.

S202: Display a resource search interface in response to a search operation on the multimedia data in a service interface.

As described above, the service interface of the target application program may include a plurality of types. For example, the service interface of the social application program includes the social conversation interface and the content display interface. Implementations of triggering the search operation performed on the multimedia data on different types of service interfaces are different. The following uses an example in which the service interface is the social conversation interface or the service interface is the content display interface and the multimedia data is an image to describe implementations of triggering the search operation to be performed on the multimedia data on the service interface and triggering the resource search interface to be displayed.

(1) The service interface is the social conversation interface. The social conversation interface includes the multimedia data displayed in the social conversation message form. In this implementation, an implementation of displaying the resource search interface in response to the search operation on the multimedia data in a service interface may include: displaying an option bar on the social conversation interface in response to a trigger event for the multimedia data on the social conversation interface, the option bar including a search option; and determining, in response to detecting a selection operation on the search option in the option bar, that the search operation for the multimedia data is generated, and displaying the resource search interface. The trigger event may include but is not limited to an event generated by performing a trigger operation (for example, a tapping, double-click, or right-click operation) on the multimedia data on the social conversation interface, an event generated in response to detecting existence of the multimedia data on the social conversation interface, an event generated in response to detecting on the social conversation interface that a cursor (for example, a cursor mapped by a device such as a stylus, a remote controller, or a mouse on a display screen) is in a display region in which the multimedia data is, and the like. An implementation in which the trigger event may be generated in response to detecting, on the social conversation interface, the multimedia data or existence of the cursor in the display region in which the multimedia data is may prompt the target user to some extent that searching may be performed on the multimedia data. In summary, in this embodiment of this application, the search operation for the multimedia data on the social conversation interface may be performed directly on the social conversation interface.

Figure 4A:
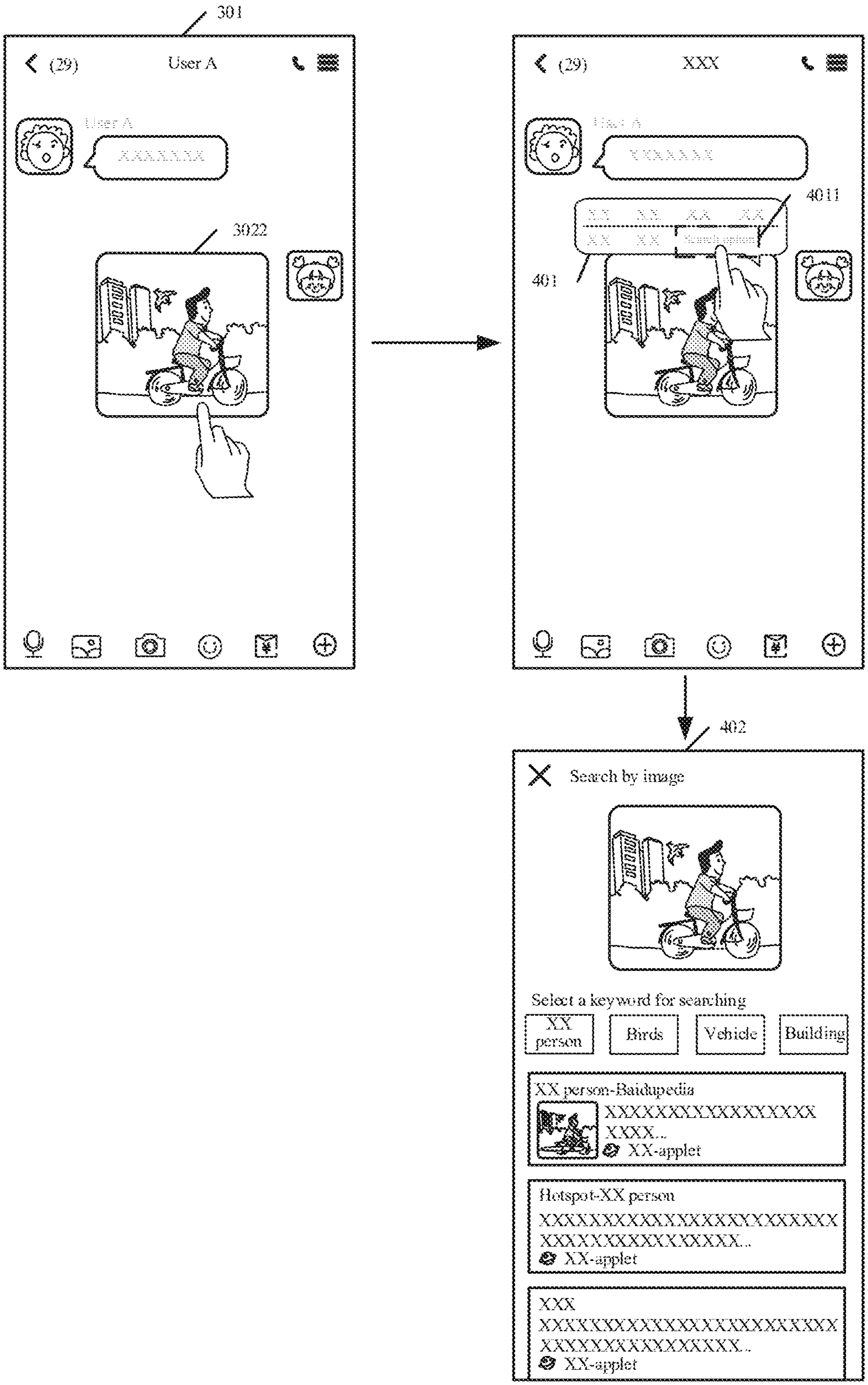
FIG. 4*a* is a schematic diagram in which a service interface is a social conversation interface according to an embodiment of this application.

If the multimedia data includes general information of the multimedia data, the general information of the multimedia data is displayed on the social conversation interface. In this case, the trigger event for the multimedia data on the social conversation interface may be a trigger event for the general information of the multimedia data on the social conversation interface. FIG. 4*a* is an exemplary schematic flowchart of performing the search operation on the general information of the multimedia data on the social conversation interface and displaying the resource search interface. As shown in FIG. 4*a*, it is assumed that the service interface is the social conversation interface 301. A thumbnail (that is, the social conversation message 3022) of an image displayed in the social conversation message form is displayed on the social conversation interface 301. When the thumbnail of the image is triggered (for example, tapped, double-clicked, or touched and held), an option bar 401 may be displayed on the social conversation interface 301. The option bar 401 includes one or more options, for example, includes a search option 4011, a copy option, and a scale-up option. If the search option 4011 in the option bar 401 is selected, it is determined that a search operation for the image is generated, which indicates that the target user wants to search for the image, and a resource search interface 402 is displayed.

(2) The service interface is the content display interface. The multimedia data is displayed on the content display interface. In this implementation, an implementation of displaying the resource search interface in response to the search operation on the multimedia data in a service interface may include: the content display interface including a search control (or referred to as a search component or the like), outputting a sharing window in response to a selection operation on the search control on the content display interface, the sharing window including a search option; and determining, in response to detecting a selection operation on the search option in the sharing window, that the search operation for the multimedia data is generated, and displaying the resource search interface. That is, in this embodiment of this application, the search operation for the multimedia data may be directly triggered on the preview interface (that is, the content display interface) of the multimedia data.

Figure 4B:
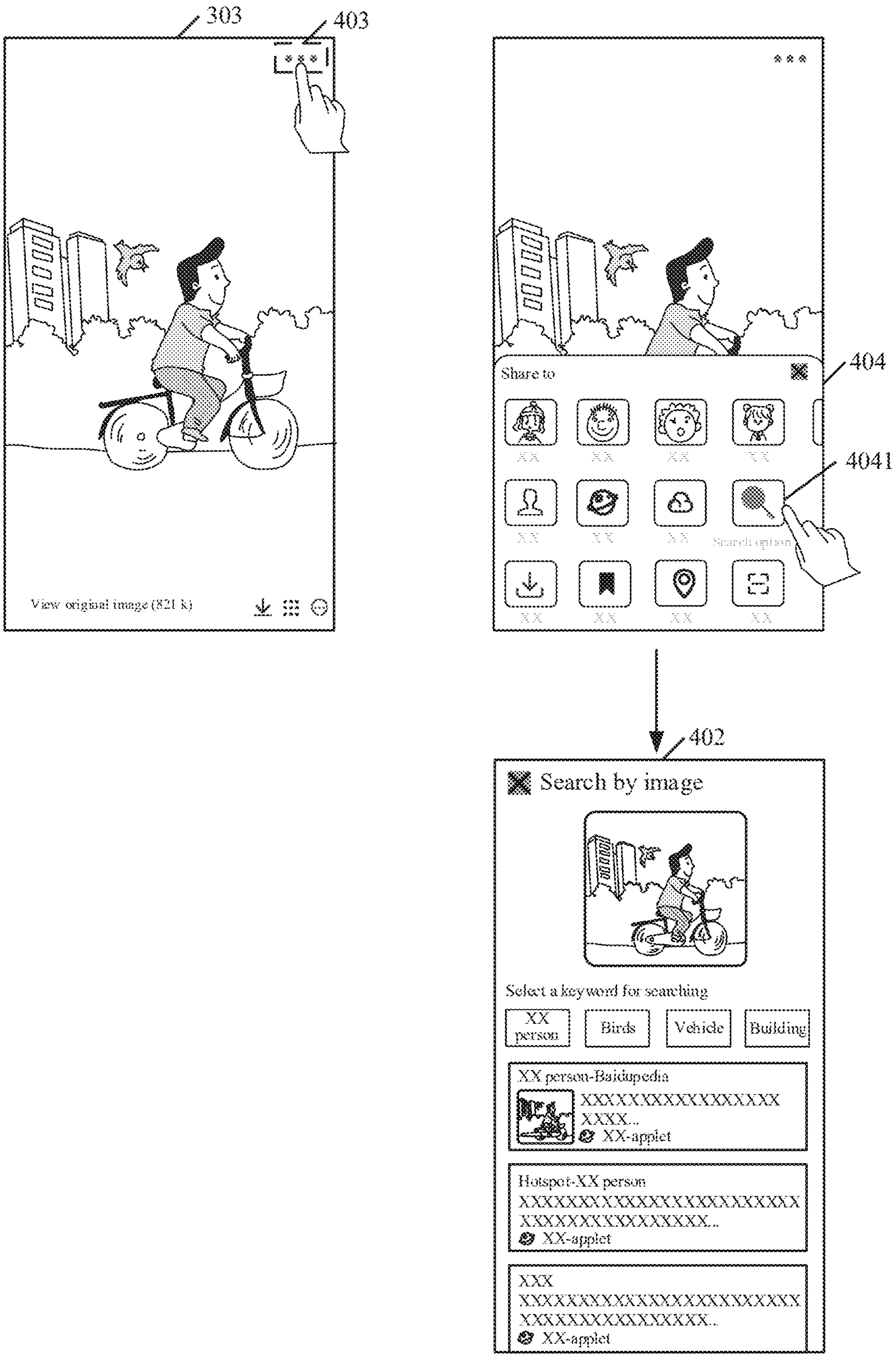
FIG. 4*b* is a schematic diagram in which a service interface is a content display interface according to an embodiment of this application.

If the multimedia data includes the data content of the multimedia data, the data content of the multimedia data is displayed on the content display interface. The search operation on the multimedia data in a service interface may be a search operation triggered for the data content of the multimedia data on the content display interface. FIG. 4*b* is an exemplary schematic flowchart of performing the search operation on the data content of the multimedia data on the content display interface and triggering the resource search interface to be displayed. As shown in FIG. 4*b*, it is assumed that the service interface is the content display interface 303, the multimedia data is an image, and the image is displayed on full screen on the content display interface 303. The content display interface 303 includes a search control 403. When the search control 403 is touched, a sharing window 404 is triggered to be displayed. The sharing window 404 includes one or more options, for example, includes a search option 4041. When the search option 4041 is touched, it is determined that a search operation for the image is triggered, which indicates that the target user wants to search for the image, and a resource search interface 402 is displayed.

The above is merely two exemplary implementations of triggering the search operation for the multimedia data. The social conversation interface 301 and the option bar 401 in FIG. 4*a* and the content display interface 303 and the sharing window 404 in FIG. 4*b* are all exemplary. For example, in addition to overlaying the content display interface 303, the sharing window 404 shown in FIG. 4*b* may be displayed in a form of an independent interface. Display styles and display positions of each interface, window, and control are not limited in this embodiment of this application.

Based on the above implementations of triggering the resource search interface to be displayed, it can be seen that, in this embodiment of this application, the search operation for the multimedia data on the social conversation interface may be triggered directly on the social conversation interface, and the multimedia data is not required to be copied and transferred. Therefore, the search operation is simplified, and search efficiency is improved.

S203: Display, in a first region, at least one search tag associated with the multimedia data.

S204: Display, in a second region in response to a selection operation on a target tag of the at least one search tag displayed in the first region, a search result associated with the target tag.

In steps S203 and S204, when the target user has a requirement of searching for the multimedia data displayed on the service interface, the target user may trigger the search operation for the multimedia data on the service interface. Then, the target terminal may display the resource search interface in response to the search operation on the multimedia data in a service interface. The resource search interface is an interface for displaying one or more search tags associated with the multimedia data and the search result associated with the target tag in the one or more search tags. The one or more search tags associated with the multimedia data and the search result associated with the target tag are both obtained by performing search processing based on the multimedia data. The above-mentioned target tag may be a default search tag (for example, any one of the one or more search tags), or a tag selected by the target user on the resource search interface. This is not limited in this embodiment of this application.

The resource search interface includes a result display region for displaying the search result. The result display region includes the first region and the second region. Further, the first region of the result display region is used for displaying the one or more search tags associated with the multimedia data. The second region of the result display region is used for displaying the search result associated with the target tag. The target tag may be a tag selected in response to the selection operation triggered for the search tag displayed in the first region. That is, the target tag is a selected search tag in the first region. In some embodiments, the resource search interface may further include the display region for displaying the multimedia data. That is, the multimedia data for which the search operation is triggered is displayed in the display region on the resource search interface.

Figure 5:
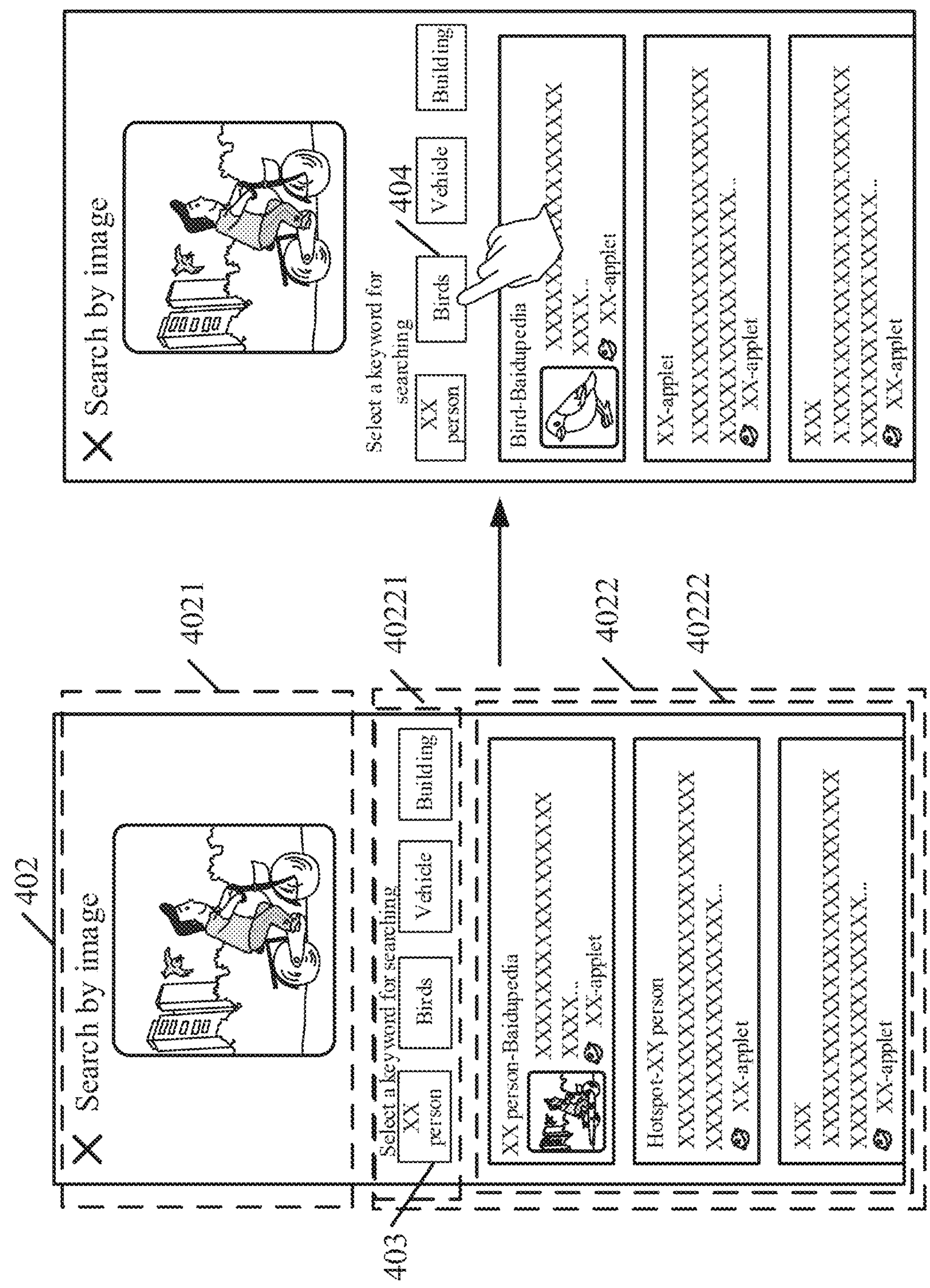
FIG. 5 is a schematic diagram of a resource search interface according to an embodiment of this application.

The following describes an exemplary schematic diagram of the resource search interface with reference to FIG. 5. As shown in FIG. 5, (1) the resource search interface 402 includes a display region 4021 for displaying the multimedia data. The display region 4021 is used for displaying the multimedia data. For example, if the multimedia data is an image, the display region 4021 may be used for displaying a thumbnail of the image, or the like. (2) The resource search interface 402 further includes a result display region 4022 for displaying the search result. The result display region 4022 includes a first region 40221 and a second region 40222.

(1) The first region 40221 is used for displaying the one or more search tags associated with the multimedia data. According to different types of multimedia data, the multimedia data is in different association relationships with a search tag. For example, if the multimedia data is an image, recognition processing may be performed on the image to obtain a key word associated with the image (for example, the keyword may indicate an image element in the image), and then the keyword of the image may be determined as a search tag. That is, an association relationship between an image and a search tag of the image may be embodied as follows: the search tag of the image may be used for indicating an image element in the image. For another example, if the multimedia data is a text, the text including one or more character strings, text recognition may be performed on the text to extract a keyword of the text, and then the keyword of the text may be determined as a search tag associated with the text. That is, an association relationship between a text and a search tag of the text may be embodied as follows: the search tag of the text may be used for indicating key content (for example, a title or a word for expressing a main idea of the text) of the text.

(2) The second region 40222 is used for displaying the search result associated with the target tag. After any search tag (for example, the target tag) in the first region 40221 is selected, a search result associated with the selected search tag may be displayed in the second region 40222. The search result is obtained by performing search based on the search tag. For example, if the selected target tag in the first region 40221 is "Xiaoming", the search result that is displayed in the second region 40222 and that is associated with the target tag is about "Xiaoming". In addition, the selected target tag may be highlighted in the first region 40221. A highlighting manner may include highlighting, color displaying, and the like. For example, highlighting means that a region occupied by the target tag is displayed with brightness higher than that of another search tag. Color displaying means that a font of the target tag is displayed in a color different from that of a font of another search tag.

In addition, if the selected target tag is switched in the first region 40221, switching may be accordingly performed to display a corresponding search result in the second region 40222. Refer back to FIG. 5. A currently selected search tag in the first region 40221 is a tag 403, and a search result associated with the tag 403 is displayed in the second region 40222. When a tag switching operation is performed in the first region 40221, for example, switching is performed in the first region 40221 to select a tag 404, the search result associated with the tag 403 is replaced with a search result associated with the tag 404 in the second region 40222.

A search tag may be selected by default in the first region on the resource search interface displayed in response to the search operation on the multimedia data in a service interface. In this case, the search tag selected by default is the target tag. A search result associated with the search tag is displayed by default in the second region. In this way, the target user may be prompted to some extent to switch the search tag to obtain search results associated with different search tags. Which search tag is selected by default is not limited in this embodiment of this application. For example, a plurality of search tags may be ranked according to a ranking rule, and a search tag arranged at a first position may be determined as the target tag. For an image, the ranking rule may include determining a target tag according to a display area of the image occupied by an image element indicated by a keyword corresponding to a search tag. If the display area occupied by the image element is larger, the search tag indicated by the keyword corresponding to the image element is arranged closer to the front, and a search tag with a largest display area (that is, arranged at a first position) may be determined as the target tag selected by default. Certainly, the above is merely one ranking rule for an image. A specific implementation of the ranking rule is not limited in this embodiment of this application.

In this embodiment of this application, the search operation may be triggered for the multimedia data on the service interface, and the resource search interface may be displayed. The at least one search tag associated with the multimedia data and the search result associated with the target tag are displayed on the resource search interface. In the foregoing solution, the search operation may be directly triggered for the multimedia data displayed on the service interface to obtain the search tag associated with the multimedia data and the search result associated with the target tag. This simplifies a search process of the multimedia data, shortens a search path, and improves the search efficiency.

Figure 6:
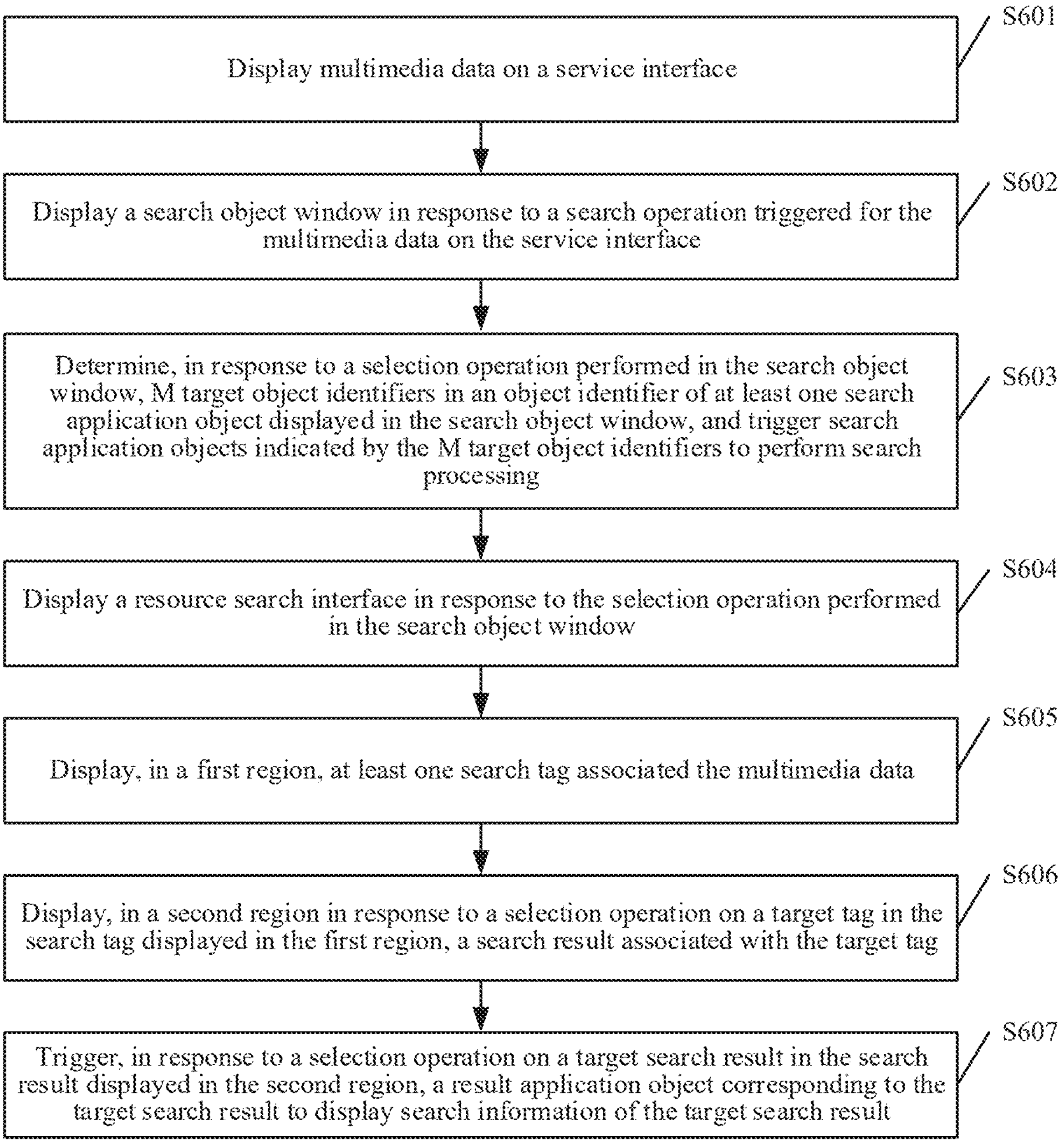
FIG. 6 is a schematic flowchart of a search processing method according to an embodiment of this application.

FIG. 6 is a schematic flowchart of a search processing method according to an exemplary embodiment of this application. The search processing method may be performed by a target terminal (for example, any terminal). The search processing method may include but is not limited to steps S601 to S607:

S601: Display multimedia data on a service interface.

A specific implementation process of step S601 may refer to related descriptions about a specific implementation process of step S201 in the embodiment shown in FIG. 2, and will not be elaborated herein.

S602: Display a search object window in response to a search operation on the multimedia data in a service interface.

S603: Determine, in response to a selection operation performed in the search object window, M target object identifiers in an object identifier of at least one search application object displayed in the search object window, and trigger search application objects indicated by the M target object identifiers to perform search processing.

In steps S602 and S603, in this embodiment of this application, a target user may select a search application object for performing search processing on the multimedia data. The search application object is a search application (or referred to as a search engine) with a search function. An object identifier of the search application object is a website of the search application object, an icon through which the search application object may be linked, or the like. The search application object may be called to perform search processing on the multimedia data.

In some embodiments, the search application object may be a third-party search application with a search function. The search application object is bound with the above-mentioned target application program. In this case, when there is the search operation for the multimedia data in the target application program, the search application object bound with the target application program may be called to search for the multimedia data. Compared with an existing manner in which the search application object is started after the multimedia data is downloaded through the target application program and then the multimedia data is copied to the search application object for searching, this embodiment of this application has the advantages that a client is not required to be restarted, traffic is reduced, the search operation is simplified, and a search speed is increased. Alternatively, the search application object may be an applet (or referred to as a search applet) that is deployed (or run) in a target application program and that has a search function. In this case, the target application program may directly search for the multimedia data by using the applet. When search is performed on the multimedia data in this way, the applet may be opened fast to perform the search operation, the search operation may be simplified, development costs of the target application program may be reduced, and search efficiency may be improved. Alternatively, the search application object may be a search function provided by a target application program. That is, the search application object is the search function deployed in the target application program. That is, the target application program has the search function. In this case, the target application program may directly perform search processing on the multimedia data. Therefore, the search operation is simplified, and search efficiency is improved.

Figure 7A:
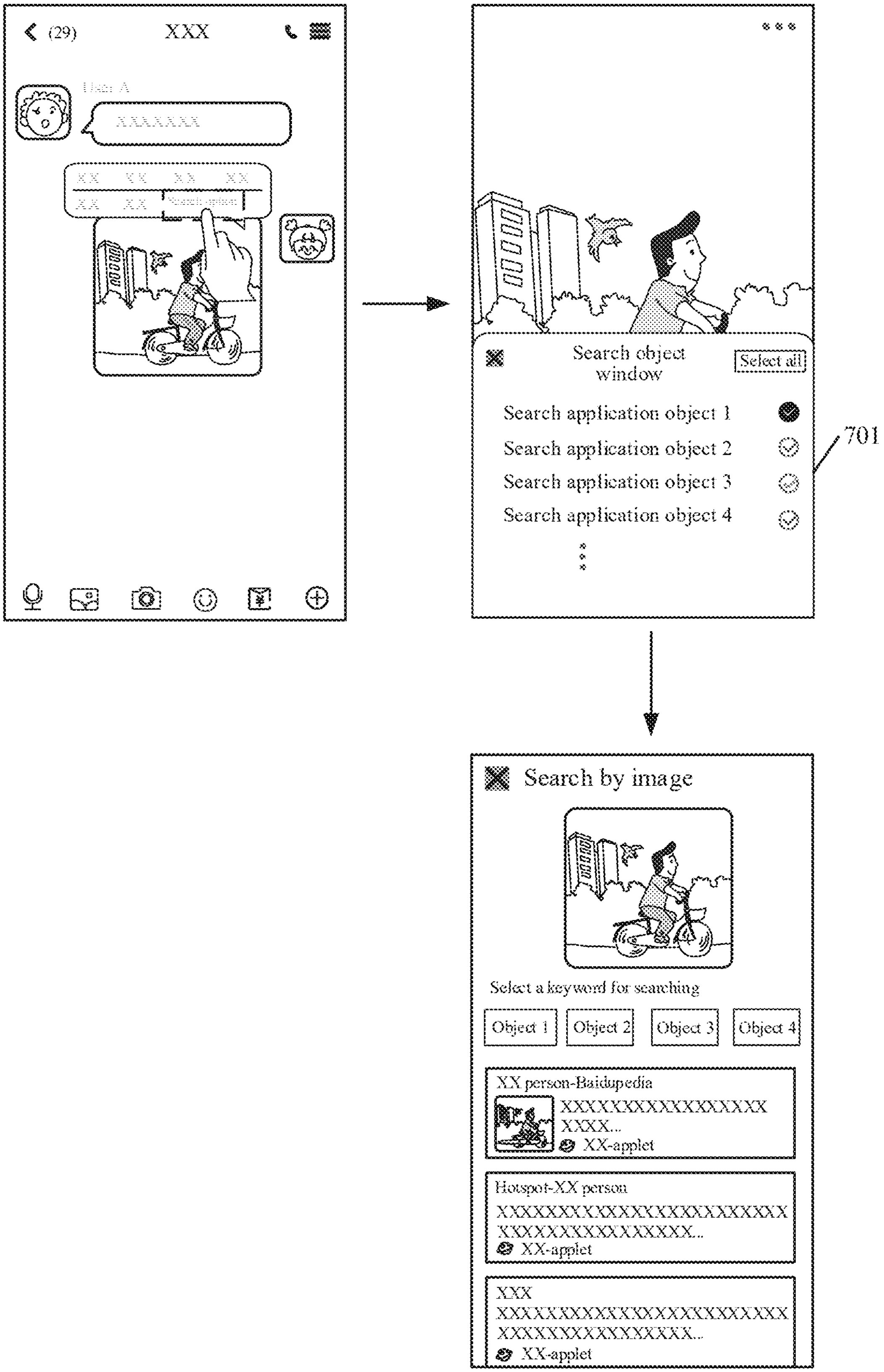
FIG. 7*a* is a schematic diagram of a search object window according to an embodiment of this application.

In specific implementations, performing the selection operation on an object identifier of any one or more search application object in the search object window indicates that the target user wants to use the search application object indicated by the selected object identifier to perform search processing on the multimedia data. Therefore, an obtained search result about the multimedia data is obtained through search with the search application object indicated by the selected object identifier. The following describes an exemplary schematic diagram of the search object window with reference to FIG. 7*a*. As shown in FIG. 7*a*, a search object window 701 is displayed in response to the search operation on the multimedia data in a service interface. The search object window 701 includes an object identifier of at least one search application object, for example, an object identifier of a search application object 1 and an object identifier of a search application object 2. The target user may select M target object identifiers from the search object window 701, M being a positive integer, which indicates that the target user wants to use search application objects indicated by the selected M target object identifiers to perform the search operation. Step S604 is triggered in response to detecting that selection of the target object identifiers is completed. It may be understood that the object identifier displayed in the search object window may include both the object identifier of the search application object and an object identifier of the search function provided by the target application program. This is not limited in this embodiment of this application.

In an implementation in which the search application object is a search applet, an implementation process in which the search applet is triggered to perform search processing on the multimedia data on a service interface of the target application program may include: displaying a search object window of the target application program in response to the search operation for the multimedia data on the service interface of the target application program, the search object window including an object identifier of one or more search applets, where the search object window may certainly further include an object identifier of a third-party search application with the search function; triggering, in a case that a selection operation is performed in the search object window and a search applet is selected from the search object window through the selection operation, the search applet to perform search processing; and triggering a search interface of the search applet to be displayed after the search applet completes search processing on the multimedia data, the search interface including a search tag obtained by the search applet by searching for the multimedia data and a search result associated with the search tag.

Figure 7B:
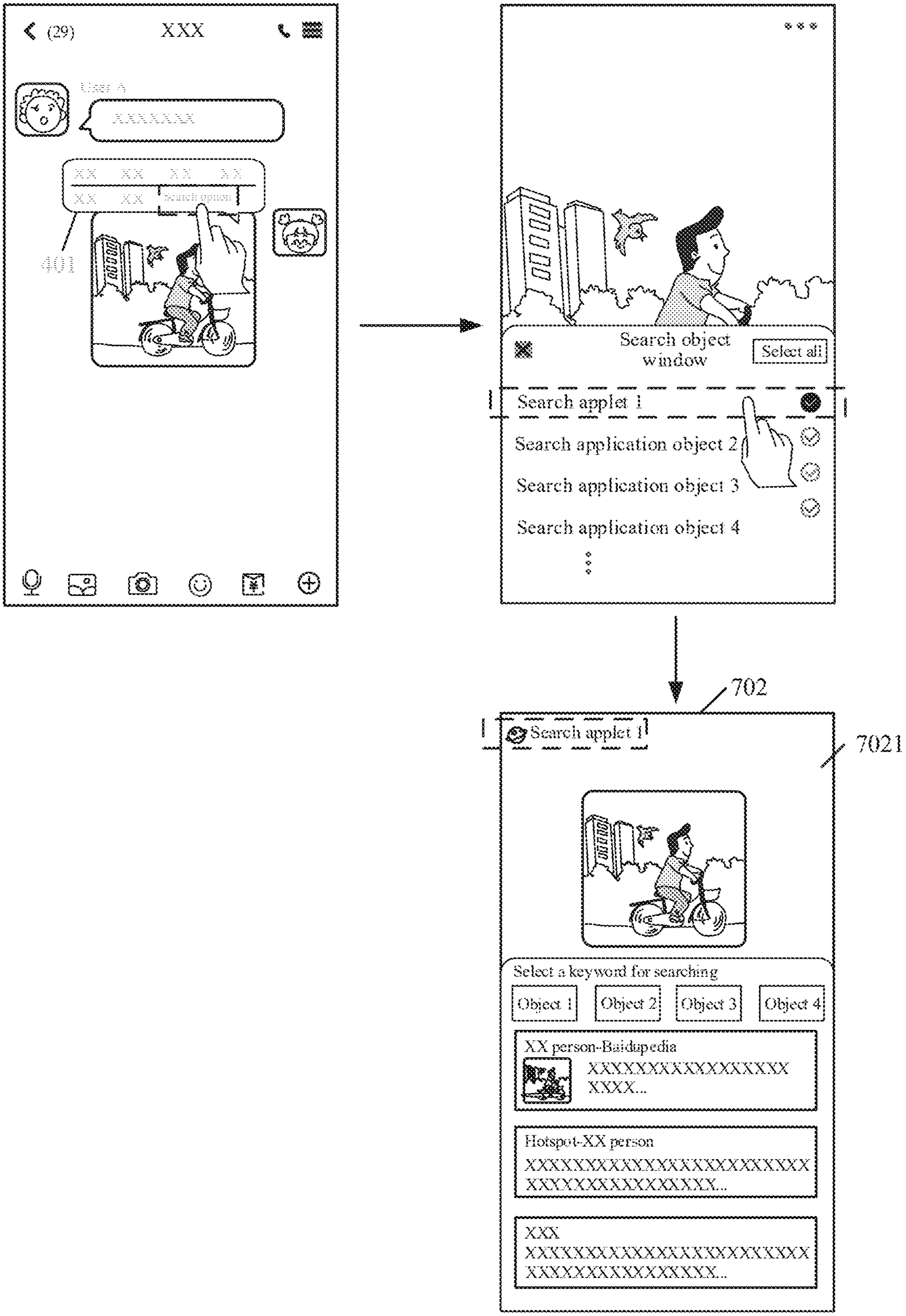
FIG. 7*b* is a schematic flowchart of performing search on multimedia data when a search application object is a search applet according to an embodiment of this application.

The following briefly describes, with reference to FIG. 7*b*, a process in which searching is performed on the multimedia data through the search applet. As shown in FIG. 7*b*, when there is the search operation for the multimedia data on the service interface of the target application program, if the service interface is a social conversation interface shown in FIG. 7*b*, and the multimedia data is displayed on the social conversation interface in a thumbnail form, the search object window may be triggered to be displayed according to the search operation. The object identifier of the search application object is displayed in the search object window. For example, the object identifier of the search applet (for example, an object identifier of a search applet 1 shown in FIG. 7*b*) is displayed in the search object window. When the object identifier of the search applet 1 is selected, it indicates that the target user wants to use the search applet 1 to search for the multimedia data. In this case, a search interface 702 of the search applet 1 is triggered to be displayed. The search tag obtained by the search applet 1 by searching for the multimedia data and a search result associated with the search tag are displayed on the search interface 702. Therefore, search is directly performed on the multimedia data in the target application program. In the foregoing implementation, the search applet is run in the target application program. In this way, the target application program may directly search for the multimedia data by using the search applet. Compared with deployment of a search entry of another application program in the target application program and jumping from the target application to another search application object with the search function for searching, the foregoing implementation has the advantages that the search applet may be opened fast to perform the search operation, the search operation may be simplified, development costs of the target application program may be reduced, and search efficiency may be improved.

In some embodiments, a search box 7021 may be set in the search interface 702 of the search applet 1 in FIG. 7*b*, such that the target user triggers search for other content through the search box 7021. In this implementation, when the target user has another search requirement during use of the target application program, the search applet may be opened in the target application program for searching. This avoids jumping from the target application program to another application program for searching, improves user experience, and increases a retention rate of the target application program. Certainly, a specific style and function setting of the search interface 702 of the search applet 1 may be set as practically required. The search interface 702 shown in FIG. 7*b* is merely an exemplary interface style.

In addition, in this embodiment of this application, when there is the search operation for the multimedia data in the target application program, searching may be performed on the multimedia data by using a default target search applet (for example, any search applet), and the search tag and the search result that are obtained by the target search applet through searching are displayed on a resource search interface of the target application program. Certainly, an object identifier of the target search applet may further be displayed on the resource search interface of the target application program, to prompt the target user that content on the current resource search interface is obtained by the target search applet through searching. Alternatively, after searching is performed on the multimedia data by using the default target search applet (for example, any search applet), a search interface of the target search applet may be directly displayed, to prompt the target user that the search result is obtained by the target search applet through searching. In the foregoing solution, a process in which the target user selects the object identifier is eliminated, a search process may be shortened to some extent, and the search efficiency is improved.

An object identifier of another search applet may further be displayed on the resource search interface of the target application program. Alternatively, an object identifier of another search applet may further be displayed on the search interface of the target search applet. For example, the object identifier of the another search applet is displayed on the search interface of the target search applet in a floating manner. This helps the target user select the another search applet to search for the multimedia data, meets a requirement of the target user for selecting a search application object, and supports a permission of the target user to select the search application object.

After the resource search interface is triggered to be displayed based on the selection operation performed by the target user in the search object window, in this embodiment of this application, the search tag for indicating the M target object identifiers is displayed in a first region. That is, in this implementation, the search tag displayed in the first region corresponds to the target object identifier. Specifically, each of at least one search tag displayed in the first region corresponds to a search application object indicated by one of the M target object identifiers. Search application objects indicated by different target object identifiers in the M target object identifiers correspond to different search tags. In brief, the search tag displayed in the first region of the resource search interface is in correspondence to the M target object identifiers (or a search application object indicated by each target object identifier). As shown in FIG. 7*a*, each search tag displayed in the first region indicates a target object identifier. When any search tag is selected, a search result that is displayed in a second region and that is associated with the any search tag is obtained by a search application object indicated by a target object identifier corresponding to the any search tag through searching. In this implementation, the search result associated with the multimedia data is from the search application object selected by the target user, and a requirement of the target user for independently selecting the search application object is met.

The above-mentioned search application object is a search application for performing search processing on the multimedia data. The search result about the multimedia data may be obtained by the search application object through searching. The search result may include but is not limited to content in a form of information, an article, audio/video, an animation, an image, and the like. A bearer of the search result may include but is not limited to an applet, a social public service account (for example, a subscription, a service account, an official account), a personal account, and the like. In another implementation, in this embodiment of this application, the target user may independently select the bearer of the search result. For example, the search object window (or another window or interface independent of the search object window) further includes an application object identifier of at least one result application object. The result application object is used as the bearer of the search result. For example, the result application object is an applet or a subscription. The target user selects a target application object identifier in the search object window, to indicate that the target user wants to bear the search result in a result application object indicated by the target application object identifier. That is, the search result displayed in the second region of the resource search interface is born in the result application object indicated by the target application object identifier. For example, the search result displayed in the second region of the resource search interface is born in a target applet (for example, any applet). That the search result is born in the result application object may mean that search information (the search information is details of the search result) indicated by the search result is born in the result application object. That is, the search information indicated by the search result is uploaded to the Internet through the result application object. For example, the search information indicated by the search result is an article, and the result application object is an applet. In this case, that the article is born in the applet may mean that the article is uploaded to the Internet through the applet. Then, the applet may be opened to open the article. Certainly, the search object window may further include a search box, and the target user may input a result application object or search application object the user wants in the search box. A specific implementation of determining the result application object and the search application object is not limited in this embodiment of this application.

In summary, in this embodiment of this application, the target user may independently select the search application object to perform search processing on the multimedia data, or the target user may independently select the result application object bearing the search result. This meets a requirement of a search scenario of the target user, and improves stickiness of the target user.

S604: Display the resource search interface in response to the selection operation performed in the search object window.

S605: Display, in the first region, the at least one search tag associated with the multimedia data.

S606: Display, in the second region in response to a selection operation on a target tag of the at least one search tag displayed in the first region, a search result associated with the target tag.

A specific implementation process of steps S604 and S605 may refer to related descriptions about a specific implementation process of steps S202 to S204 in the embodiment shown in FIG. 2, and will not be elaborated herein.

S607: Trigger, in response to a selection operation on a target search result in the search result displayed in the second region, a result application object corresponding to the target search result to display search information of the target search result.

As described above, the result application object may include but is not limited to an applet, a social public service account (for example, a subscription, a service account, an official account), a personal account, and the like. For case of description, the following uses an example in which the result application object is an applet for description. That is, the result application object is an applet run in the target application program.

In this embodiment of this application, the search result displayed in the second region of the resource search interface may be triggered to trigger search information of the search result to be displayed. The search information is details of the search result. In specific implementations, when the selection operation on the target search result (for example, any search result) in the second region of the resource search interface is detected, the result application object corresponding to the target search result is triggered, in response to the selection operation on the target search result, to display the search information of the target search result. The search result displayed in the second region includes result prompt information and an application object identifier of a result application object corresponding to the result prompt information. This helps the target user to clearly know about key information (for example, result prompt information) of each search result and a result application object for bearing the search result.

Figure 8:
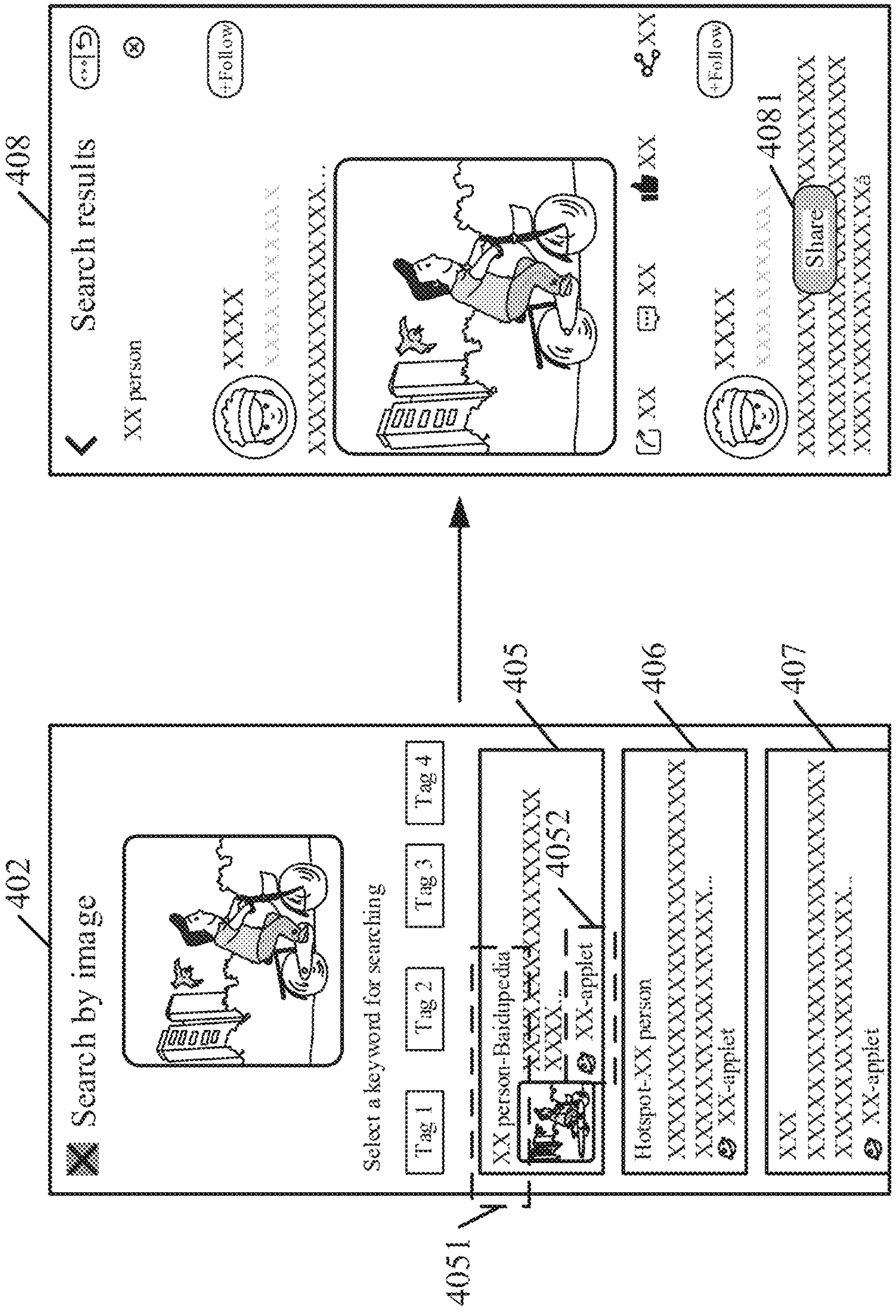
FIG. 8 is a schematic flowchart of triggering a target search result according to an embodiment of this application.

The following describes, in detail with reference to FIG. 8, related content such as the search tag on the resource search interface, the search result associated with the target tag, and an implementation of triggering the search information of the target search result to be displayed. As shown in FIG. 8, related content of the search tag on the resource search interface and the search result associated with the search tag may refer to the following description. It is assumed that the multimedia data is an image, and a plurality of search tags, for example, a search tag 1, a search tag 2, and a search tag 3, are displayed in the first region of the resource search interface 402. When the target tag (for example, any search tag) in the first region is selected, the target tag may be highlighted in the first region to prompt the target user that the highlighted target tag is in a selected state. A highlighting manner may refer to the above description. In addition, when the target tag in the first region is selected, the search result associated with the target tag may be displayed in the second region.

Since a display screen of the target terminal has a limited display area, not all search tags associated with the multimedia data may be displayed in the first region. Based on this, in this embodiment of this application, when there is a slide event in the first region, a hidden search tag is displayed in the first region in a sliding manner. The slide event may include but is not limited to an event generated in the first region by triggering a sliding axis, an event generated in the first region by performing a slide operation on the search tag, and the like. Similarly, not all search results may be displayed in the second region. Therefore, a similar or same manner may be used to implement sliding display of the search result in the second region. Elaborations are omitted herein.

Refer back to FIG. 8. The search result about the multimedia data is displayed in the second region. In some embodiments, search results associated with one or more search tags may be displayed in the second region in a mixed manner. For example, the search tag 1, the search tag 2, and the search tag 3 are displayed in the first region. In this case, a search result associated with the search tag 1, a search result associated with the search tag 2, and a search result associated with the search tag 3 may be displayed in the second region at the same time. A plurality of search results associated with different or same search tag may be arranged and displayed in the second region according to a preset rule. The preset rule may include but is not limited to the following.

(1) A chronological order in which the search results are uploaded to the Internet: for example, the plurality of search results are ranked in an order from early to late time of uploading to the Internet. For example, a search result 1 is uploaded to the Internet at 12:00 on April 8, a search result 2 is uploaded to the Internet at 17:00 on April 8, and a search result 3 is uploaded to the Internet at 21:00 on April 7. In this case, it is determined that a ranking sequence of the search result 1, the search result 2, and the search result 3 in the second region is the search result 3→the search result 1→the search result 2.

(2) A popularity of the search result (for example, a click rate, a view count, a collection volume, or a playback volume): for example, the plurality of search results are ranked from high to low playback volumes of the search results. For example, a playback volume of a search result 1 is 200, a playback volume of a search result 2 is 800, and a playback volume of a search result 3 is 250. In this case, it is determined that a ranking sequence of the search result 1, the search result 2, and the search result 3 in the second region is the search result 2→the search result 3→the search result 1.

(3) A relevance between the search result and a historical browsing behavior of the target user: the historical browsing behavior of the target user may include but is not limited to liking, collecting, playing, and the like of the search result. For example, a view count of a search result 1 (or a result application object corresponding to the search result 1) by the target user in historical duration (for example, 24 hours from a current moment (that is, a moment at which the search result is triggered to be displayed in the second region)) is 2, a view count of a search result 2 (or a result application object corresponding to the search result 2) by the target user in the historical duration is 0, and a view count of a search result 3 (or a result application object corresponding to the search result 3) by the target user in the historical duration is 1. In this case, it is determined that a ranking sequence of the search result 1, the search result 2, and the search result 3 in the second region is the search result 1→the search result 3→the search result 2.

The above is merely several exemplary preset rules for ranking the plurality of search results. A specific implementation of the preset rule is not limited in this embodiment of this application.

When there is the target tag in the first region, if the target tag is selected by the target user by performing the selection operation on the one or more search tags in the first region, only the search result associated with the target tag may be displayed in the second region, or the search result associated with the target tag is displayed above the rest in the second region. For example, if the target tag is the search tag 1, the search result displayed in the second region may be associated with the search tag 1. For example, the search result that is displayed in the second region and that is associated with the search tag 1 may include a search result 405, a search result 406, a search result 407, and the like. Any search result includes result prompt information and an application object identifier of a result application object corresponding to the result prompt information. For example, the search result 405 includes result prompt information 4051 and an application object identifier 4052 of a result application object corresponding to the result prompt information 4051. The result prompt information 4051 may be summary information of the search result 405, and is used for expressing main content of the search result 405 or the like. The application object identifier 4052 is used for indicating a bearer for bearing the search result 405. For example, when indicating that the result application object is an applet, the application object identifier 4052 is used for prompting the target user that the search result is provided by the applet.

Refer back to FIG. 8. After the selection operation is triggered for the target search result in the second region, a specific implementation of triggering the search information of the target search result to be displayed may refer to the following description. If the search result 405 is selected, the target search result is the search result 405. In this case, a result application object corresponding to the search result 405 is triggered, in response to a selection operation on the search result 405, to display search information of the search result 405. For example, a search result interface 408 of the result application object is displayed. The search result interface 408 includes complete information of the search result 405 corresponding to the result prompt information 4051. For example, the search result 405 is a text, the result prompt information 405 may be a text tile of the text, and the search result interface 408 includes complete text content of the text.

A specific style of the search result interface of the result application object and a function of the search result interface may be defined according to a service requirement of service personnel. In this embodiment of this application, the search result interface shown in FIG. 8 is used as an example for description, which will not form a limitation on this embodiment of this application. For example, if the result application object is an applet, a style and a function of a search result interface of the applet may be customized by a developer of the applet. For example, the result application object supports a sharing operation in the search result interface to share the search result. In specific implementations, a sharing control is displayed when the result application object displays the search information of the target search result. The search result interface 408 shown in FIG. 8 includes a sharing control 4081. A search identifier corresponding to the target search result is obtained from the second region in response to a touch operation on the sharing control 4081. The search identifier may be used for uniquely identifying the target search result. The search identifier may include a link (for example, a network address) of the target search result. The target search result may be accessed through the link of the target search result. After the search identifier corresponding to the target search result is obtained, sharing processing may be performed on the search identifier. Certainly, a social application program may support sharing of the search result. A specific implementation of a sharing operation performed when the social application program supports sharing may refer to the above descriptions, and will not be elaborated herein.

Figure 9:
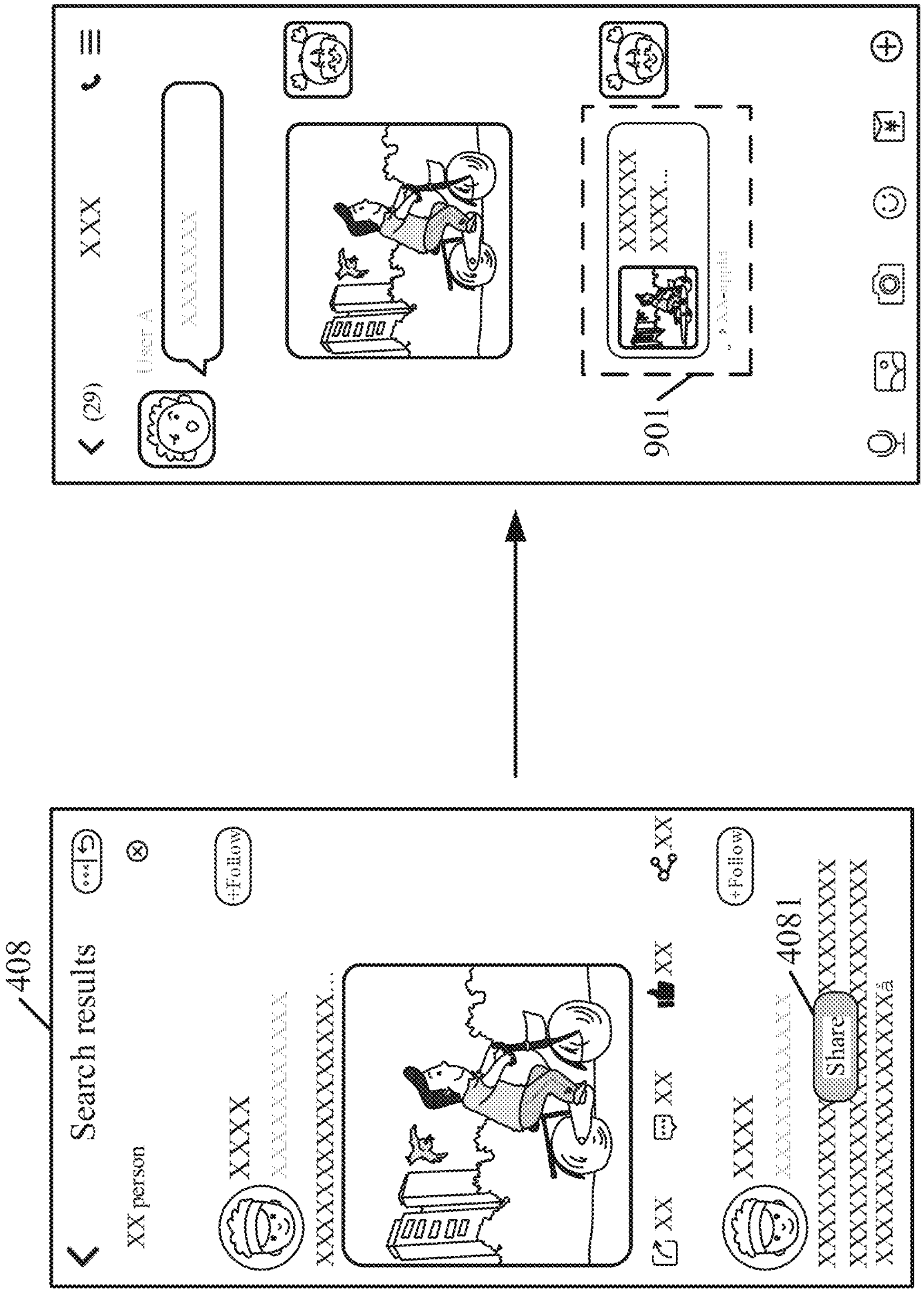
FIG. 9 is a schematic diagram of sharing a search identifier of a target search result to a social conversation interface in a social conversation message form according to an embodiment of this application.

The following describes several implementations of sharing processing. For example, in a social conversation scenario, sharing processing may include but is not limited to sharing the target search result to the social conversation interface in a social conversation message form. The social conversation interface may be a conversation interface for initiating a search request for the multimedia data. In this implementation, the target user may be helped to fast share the search result, the sharing operation may be simplified, and sharing efficiency may be improved. FIG. 9 is an exemplary schematic diagram of sharing the search identifier of the target search result to the social conversation interface in the social conversation message form. As shown in FIG. 9, a social conversation message 901 about the search identifier is displayed on the social conversation interface, which may include the search identifier of the target search result and an object identifier of the result application object corresponding to the target search result. For another example, sharing processing may further include sharing the target search result to a social public service interface (for example, Moments or a feed flow interface). For another example, in addition to the foregoing sharing the target search result, sharing processing may further include sharing the result application object corresponding to the target search result. Specifically, the application object identifier of the result application object may be shared. In this implementation, sharing processing may include sharing the application object identifier of the result application object corresponding to the target search result to the social conversation interface, the social public service interface, or the like. The foregoing sharing function may be provided by the result application object. Alternatively, the sharing function may be provided by an application program (for example, the social application program for displaying the social conversation interface) run in the result application object.

In this embodiment of this application, the search operation may be performed for the multimedia data on the service interface, and the resource search interface may be displayed. The at least one search tag associated with the multimedia data and the search result associated with the target tag are displayed on the resource search interface. In the foregoing solution, the search operation may be directly performed for the multimedia data displayed on the service interface to obtain the search tag associated with the multimedia data and the search result associated with the target tag. This simplifies a search process of the multimedia data, shortens a search path, and improves the search efficiency. In addition, the target user may independently select the search application object to perform search processing on the multimedia data, or the target user may independently select the result application object carrying the search result. This meets the requirement of the search scenario of the target user, and improves the stickiness of the target user. Moreover, in this embodiment of this application, sharing processing may further be performed on the search result. This can help the target user fast share the search result, simplify the sharing operation, and improve the sharing efficiency.

Based on the above schematic diagram of each interface in the search processing methods shown in FIG. 2 and FIG. 6, the following describes two exemplary search processing scenarios by using an example in which the multimedia data is an image and the image includes a person element or a commodity element, to completely describe an implementation process of the search processing method.

Figure 10A:
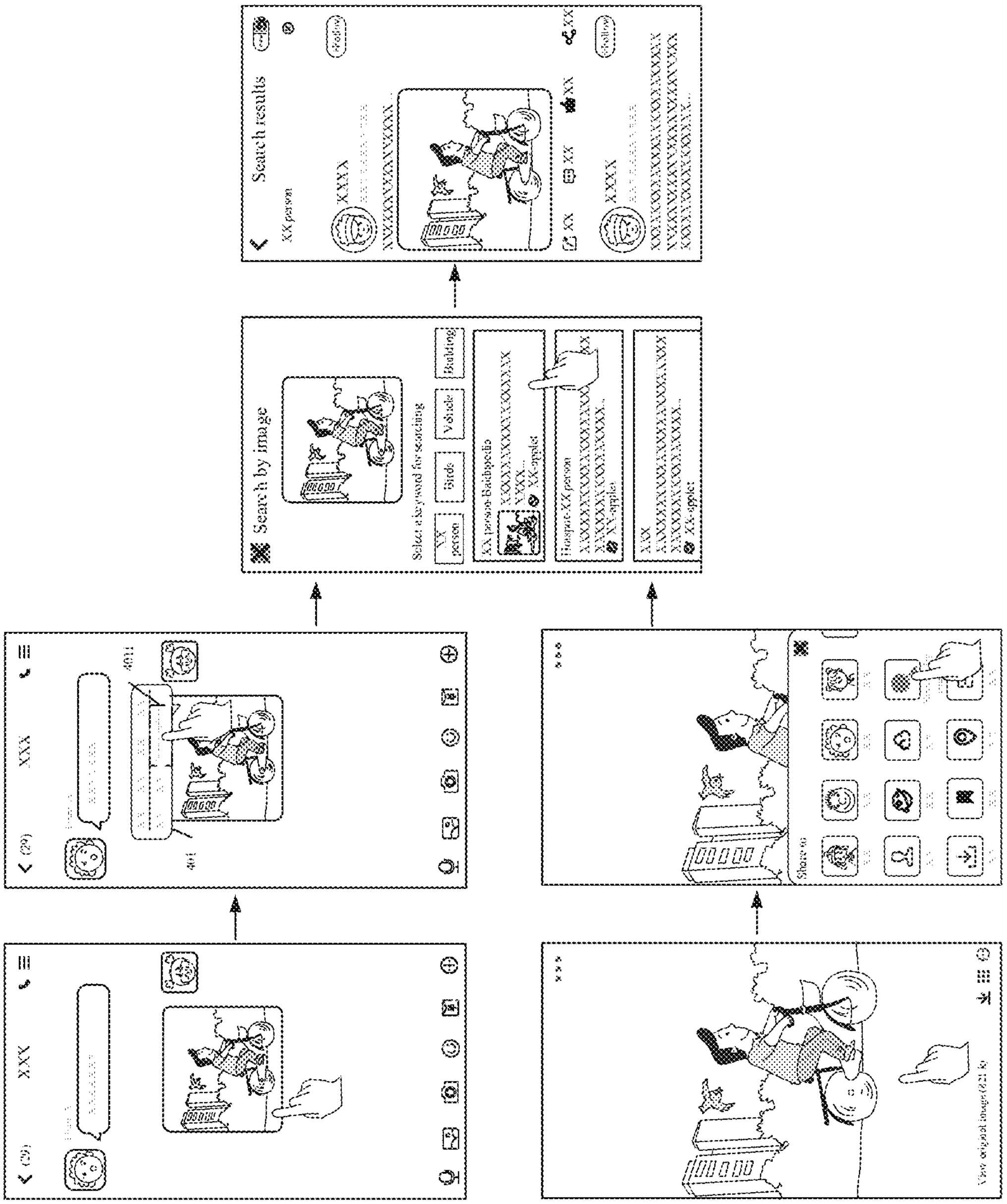
FIG. 10*a* is a schematic diagram of a search processing scenario according to an embodiment of this application.

(1) The image includes the person element. For example, the image is a live image during livestreaming of a livestreamer. In this case, the person element in the live image is the livestreamer. In this implementation, when search processing is performed on the image, the person element in the image is mainly recognized. In this way, an obtained search tag associated with the image may indicate the person element, and a search result associated with the search tag involves a person indicated by the person element. The following uses an example in which the image is the image during livestreaming of the livestreamer to briefly describe, with reference to FIG. 10*a*, an interface process in which the search operation for the image is triggered and the search result is obtained. As shown in FIG. 10*a*, the live image is displayed in a display region of the resource search interface, and at least one search tag associated with the live image is displayed in the first region. The at least one search tag is related to livestreaming. For example, the search tag indicates the livestreamer in the live image.

Figure 10B:
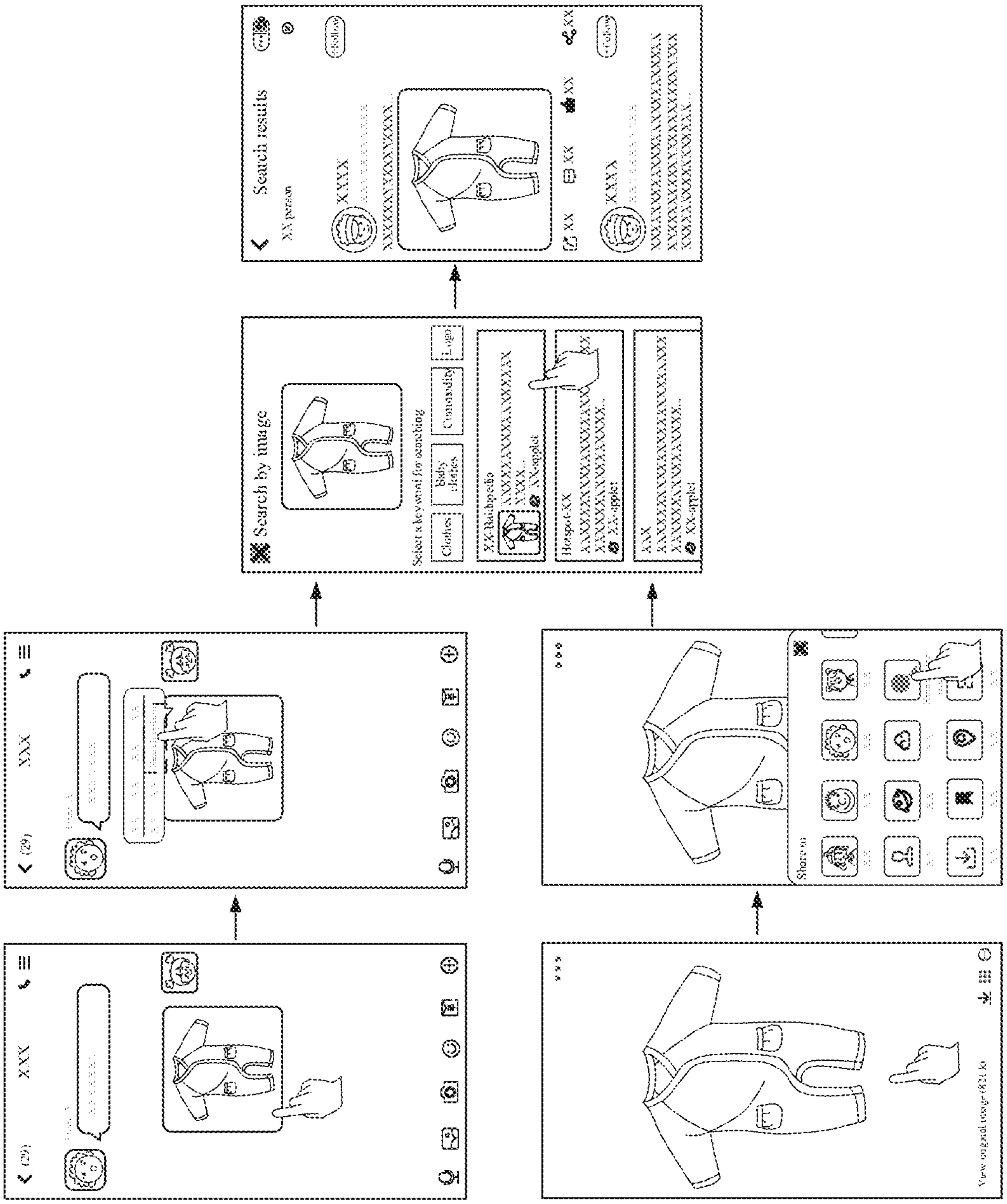
FIG. 10*b* is a schematic diagram of a search processing scenario according to an embodiment of this application.

(2) The image includes the commodity element. For example, the image is a promotion image for commodity marketing. In this case, the promotion image includes a commodity. In this implementation, when search processing is performed on the promotion image, the commodity, a location, an icon, and another element in the image are mainly recognized. In this way, an obtained search tag associated with the promotion image may indicate the commodity element. When the image is the promotion image, a schematic diagram of an interface process in which the search operation for the promotion image is triggered and the search result is obtained may refer to FIG. 10*b*. As shown in FIG. 10*b*, the promotion image is displayed in a display region of the resource search interface, and at least one search tag associated with the promotion image is displayed in the first region. For example, the search tag indicates the commodity icon (for example, a logo) in the promotion image.

The above is merely two exemplary search processing scenarios. It may be understood that the search processing scenario may change according to different types of the multimedia data (for example, types of elements in the image). A specific search processing scenario is not limited in the embodiments of this application.

Figure 11A:
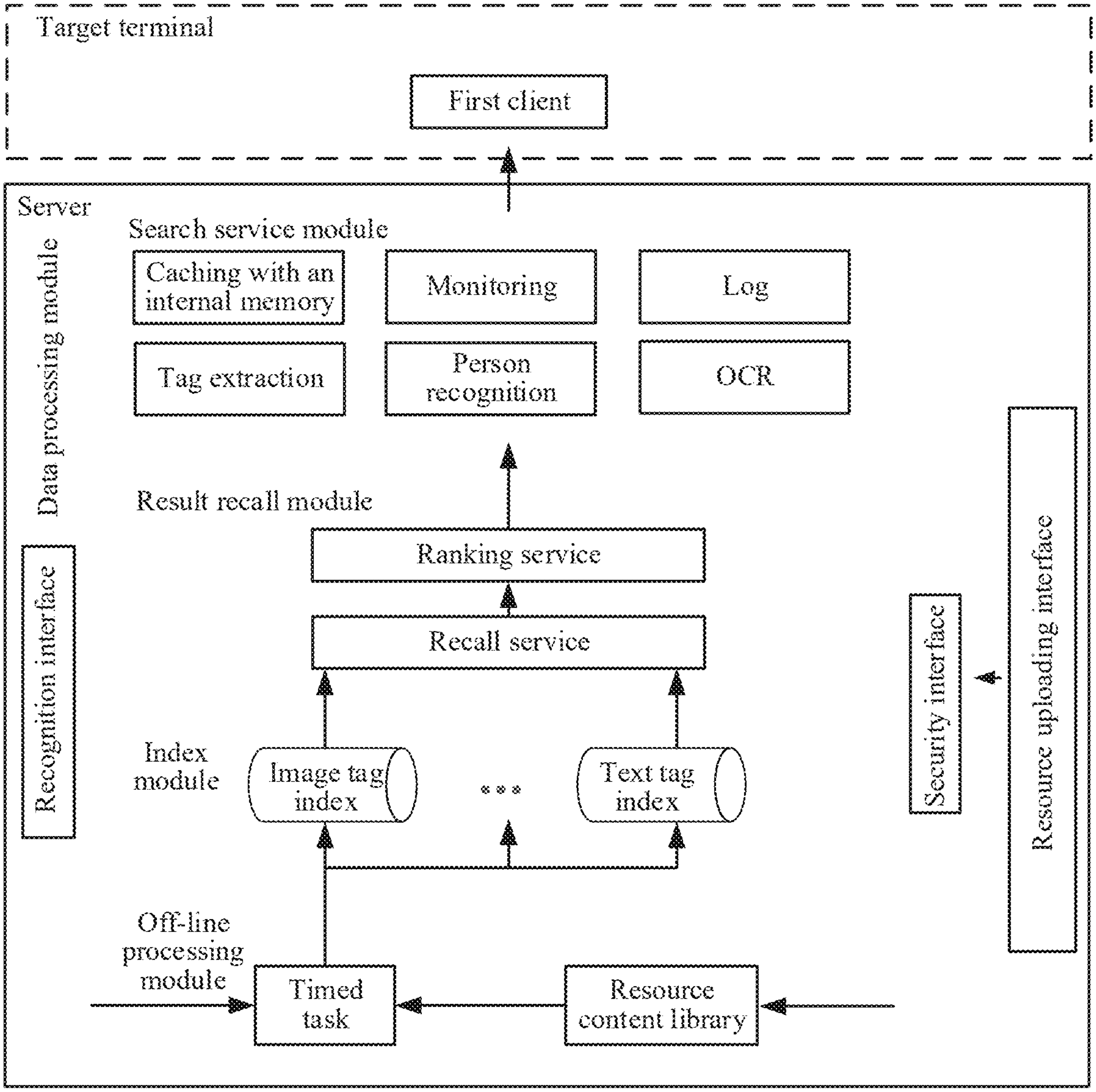
FIG. 11*a* is a schematic diagram of an architecture of a search processing system according to an embodiment of this application.

The foregoing embodiments describe an overall solution process of the search processing method provided in the embodiments of this application. The following will describe in detail an overall implementation process of the embodiments of this application in background. The following first briefly describes a search processing system with reference to an architectural diagram shown in FIG. 11*a*, to help understand the overall process implemented in background. As shown in FIG. 11*a*, the search processing system includes a first client and a server. The first client may be the above-mentioned target application program. The first client is run in the above-mentioned target terminal. The server is a background device providing a technical service for the target terminal or the first client run in the target terminal. The server may be an independent physical server, a server cluster or distributed system including a plurality of physical servers, or a cloud server providing a basic cloud computing service such as a cloud service, a cloud database, cloud computing, a cloud function, cloud storage, a network service, cloud communication, a middleware service, a domain name service, a security service, a content delivery network (CDN), or a big data and artificial intelligence (AI) platform. A quantity and a type of the server are not limited in this embodiment of this application. The target terminal may communicate directly or indirectly with the server. A communication mode is not limited in this embodiment of this application.

In specific implementations, the first client is configured to transmit a data processing request to the server. The data processing request carries to-be-processed multimedia data. The server may be configured to receive the data processing request transmitted by the first client, and perform recognition processing on the multimedia data to obtain at least one search tag associated with the multimedia data carried in the data processing request. The server is further configured to determine a search result associated with a target tag according to the target tag in the at least one search tag, and transmit the at least one search tag and the search result associated with the target tag to the first client. The first client is further configured to receive the at least one search tag and the search result associated with the target tag, which are returned by the server, display, in a first region of a resource search interface, the at least one search tag associated with the multimedia data, and display, in a second region, the search result associated with the target tag.

With reference to FIG. 11*a*, it can be seen that the server further includes a plurality of modules. For example, the server includes a search service module, a result recall module, a data processing module, an index module, and an off-line processing module. In this case, the operations performed by the server may be performed by the plurality of modules of the server. The search service module may be configured to interact with the data processing module to obtain the search tag associated with the multimedia data. The search service module is further configured to interact with the result recall module, and cache the search result by using an internal memory. In addition, the search service module may further be configured to monitor user data such as a search behavior of a target user, for example, generate a log based on the user data, for subsequent data analysis. The index module may be configured to associatively store a search resource uploaded by a provider (or a developer) of a result application object and a search tag corresponding to the search resource. The off-line processing module may be configured to obtain the search resource uploaded by the provider of the result application object, and regularly transmit the search resource to the data processing module to perform recognition processing to obtain the search tag associated with the search resource.

A process in which the server performs the search processing method by using each module may include the following operations. After the first client transmits the data processing request to the server, the server transmits, through the search service module, the multimedia data to the data processing module in response to the data processing request transmitted by the first client. The server performs, through the data processing module, recognition processing on the multimedia data to obtain the at least one search tag associated with the multimedia data, and performs, through the result recall module, search processing according to the target tag to obtain the search result associated with the target tag. The data processing module may include a recognition interface. A recognition algorithm may be called through the recognition interface to recognize the multimedia data to obtain the search tag associated with the multimedia data. That is, in this embodiment of this application, encapsulation of an existing recognition algorithm is supported. In this way, the recognition algorithm may be directly called through the recognition interface provided by the data processing module to recognize the multimedia data. Certainly, different types of recognition algorithms are for different types of multimedia data. A type of the recognition algorithm is not limited in this embodiment of this application.

In addition, the result recall module may recall the search result associated with the target tag from the index module. The index module stores search resources associated with different search tags. When any search tag is used as the target tag, all or some search resources associated with the search tag are used as the search result associated with the target tag. Each search resource in the index module is provided by a provider (or a developer) of a result application object. For example, the result application object is an applet, and the search resource is provided by a developer of the applet. Specifically, the search processing system further includes a second client. The second client is the target application program used by a user who logs on to or registers the result application object. An implementation process in which the server receives the search resource transmitted by the second client may include the following operations. (1) The second client is configured to transmit the search resource provided by the result application object to the server. As shown in FIG. 11*a*, the second client uploads the search resource to the server through a resource uploading interface provided by the server. (2) After receiving the search resource transmitted by the second client, the server may first perform validity checking on the search resource, and after successful checking, transmits the search resource to the off-line processing module through the off-line processing module. Validity checking may be: (1) checking whether a data format of the search resource meets a data format requirement of the server: for example, a data format of data stored in the server is a file format, and when a format of the uploaded search resource is a table format, it is determined that the search resource does not pass checking, that is, the search resource cannot be stored in local space of a target storage node; (2) checking whether the search resource is valid or moralistic data, for example, checking whether the search resource includes violent data, false information, and the like, and in response to detecting that the search resource includes invalid data or information contrary to morality, determining that the search resource does not pass checking; (3) checking whether a source of the search resource conforms to a rule: for example, setting data stored in the server to all come from a result application object A, and when the search resource comes from a result application object B, determining that the search resource does not pass checking, that is, the search resource cannot be stored to the server; and the like. The above is merely several exemplary checking manners. A manner in which the server checks the search resource is not limited in this application. (3) The server receives, through the data processing module, the search resource transmitted by the off-line processing module, performs recognition processing on the search resource to obtain the search tag associated with the search resource, and returns the search tag to the off-line processing module. (4) The server transmits the search tag and the search resource to the index module through the off-line processing module, such that the index module associatively stores the search tag and the search resource.

For example, in a process in which the index module associatively stores the search resource and the search tag associated with the search resource, it is assumed that the search resource includes a search resource 1, a search resource 2, and a search resource 3, and after the data processing module performs recognition processing on each search resource, a tag associated with the search resource 1 is a tag 1 and a tag 2, a tag associated with the search resource 2 is the tag 2 and a tag 3, and a tag associated with the search resource 3 is the tag 1 and the tag 3. In this case, the index module stores the search resource 1 and the search resource 3 under an index of the tag 1, stores the search resource 1 and the search resource 2 under an index of the tag 2, and stores the search resource 2 and the search resource 3 under an index of the tag 3. If the target tag is the tag 1, at least one of the search resource 1 and the search resource 3 under the index of the tag 1 may be determined as the search result associated with the target tag.

The above uses an example in which the search service module, the result recall module, the data processing module, the index module, and the off-line processing module are modules of the server for description. However, one or more of the search service module, the result recall module, the data processing module, the index module, and the off-line processing module may serve to participate in a search processing process as independent devices. For example, the data processing module may be a server with a data processing capability. An existence form of each module is not limited in this embodiment of this application.

Figure 11B:
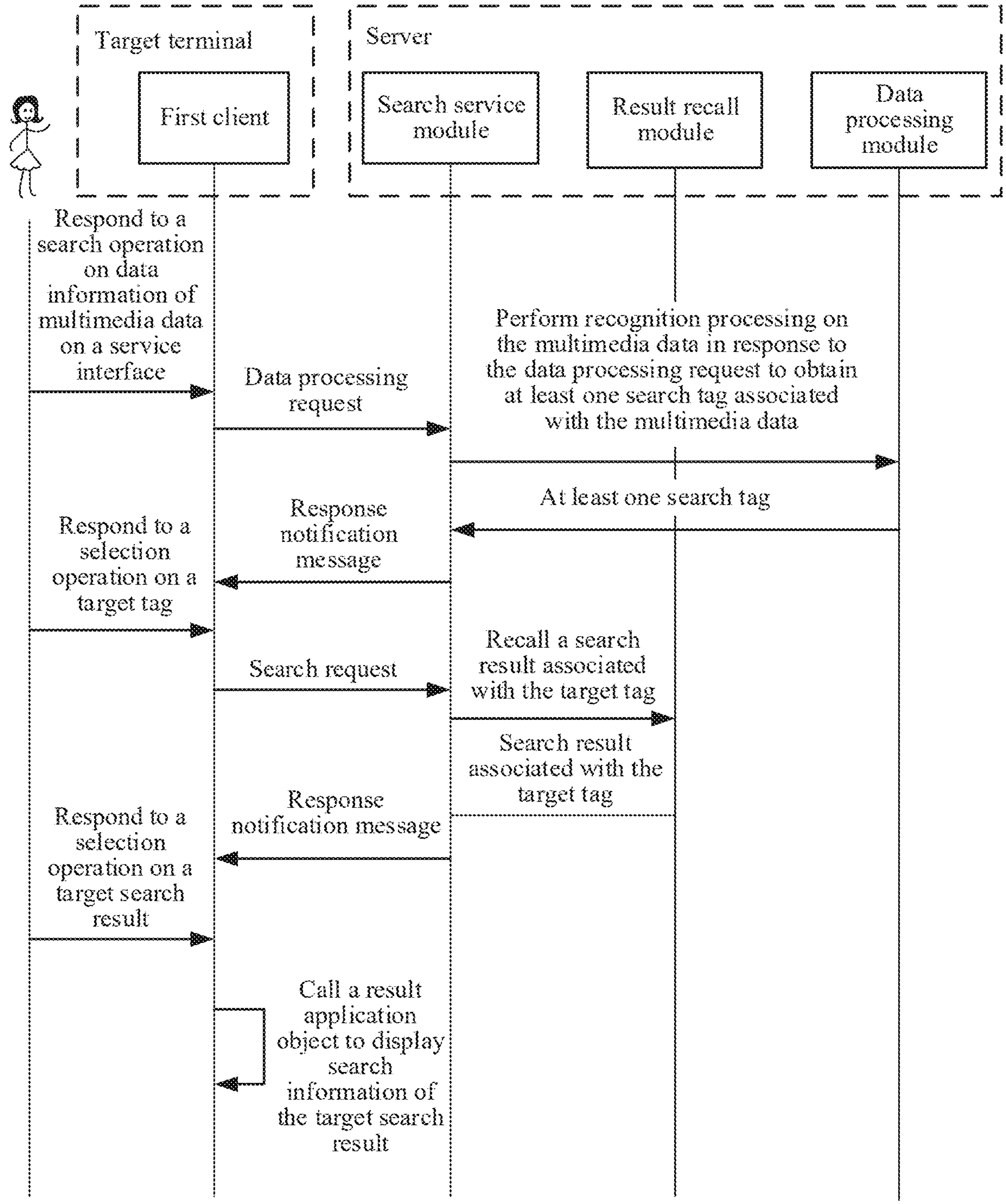
FIG. 11*b* is a schematic flowchart of a search processing method according to an embodiment of this application.

Based on the search processing system shown in FIG. 11*a*, the following more intuitively describes, with reference to FIG. 11*b*, a process in which the first client and the server perform the search processing method together. As shown in FIG. 11*b*, the search processing method may include steps s11 to s17.

In s11, the first client generates a data processing request in response to a search operation triggered for multimedia data on a service interface, the data processing request carrying the to-be-processed multimedia data.

In s12, the server obtains the data processing request, specifically receives the data processing request transmitted by the first client, and performs recognition processing on the multimedia data in response to the data processing request to obtain at least one search tag associated with the multimedia data. The server further generates a response notification message based on the at least one search tag, the response notification message including the at least one search tag. Then, after the server transmits the response notification message to the first client, the response notification message may be used for triggering the first client to perform step s13.

In s13, the first client receives the response notification message. In this case, the response notification message includes the at least one search tag associated with the multimedia data. The first client displays, on a resource search interface according to the response notification message, the at least one search tag associated with the multimedia data.

In specific implementations, after receiving the response notification message transmitted by the server, the first client may display, in a first region of the resource search interface according to the response notification message, the at least one search tag associated with the multimedia data.

In an implementation, in addition to one or more search tags, if the response notification message further includes a search result associated with a target tag in the one or more search tags, in addition to triggering the first client to display the at least one search result in the first region of the resource search interface, the response notification message is further used for triggering the first client to display, in a second region of the resource search interface, the search result associated with the target tag. The target tag may be determined from the one or more search tags according to a ranking rule. A related description about the ranking rule may refer to the related description in the embodiment shown in FIG. 2, and is omitted herein. In other words, after performing recognition processing on the multimedia data to obtain the at least one search tag, the server may determine the target tag from the at least one search tag, and obtain, through searching, the search result associated with the target tag. In this way, the server may transmit the response notification message including the at least one search tag and the search result associated with the target tag in the at least one search tag to the first client, and the first client may display, on the resource search interface based on the response notification message, both the at least one search tag and the search result associated with the target tag. In this implementation, the target user may be prompted to some extent to switch to select different search tags on the resource search interface to obtain search results corresponding to different search tags.

In s14, the first client generates a search request in response to a selection operation performed on the at least one search tag, the search request including the target tag selected by the selection operation performed on the at least one search tag, and transmits the search request to the server.

In s15, the server receives the search request transmitted by the first client, and performs search processing according to the target tag to obtain the search result associated with the target tag. The server generates a result notification message based on the search result associated with the target tag, the result notification message being used for triggering the first client to display, in the second region of the resource search interface, the search result associated with the target tag.

The following provides an implementation in which each module of the server performs the foregoing method. Specifically, the server transmits the target tag to the result recall module through the search service module. The result recall module performs recall processing according to the target tag to obtain the search result associated with the target tag. The result recall module returns the search result associated with the target tag to the search service module, such that the search service module transmits the response notification message generated based on the search result associated with the target tag to the first client.

In some embodiments, the result recall module may recall the search result in a multi-path recall manner (that is, recall processing is performed by using different models, policies, or features). In this call, recall is pre-ranking recall. That is, a large quantity of search results are recalled. The result recall module further performs ranking processing on the large quantity of search results to obtain search results arranged in a specific order. In a process in which ranking processing is performed on a plurality of search results, the plurality of search results may be ranked by using the ranking rule. The ranking rule may include but is not limited to ranking according to an association degree of the search result and the target tag. For example, a search result corresponding to a high association degree is arranged before or above a search result corresponding to a low association degree. The association degree herein may be represented by a pixel value of an image element. For example, if a pixel value of a person element in the image is 20,000, and a pixel value of a hat element is 6,000, it is determined that an association degree between the person element and the image is higher than that between the hat element and the image. Alternatively, the ranking rule is ranking according to a popularity of the search result in a target time period. The popularity may be determined by a historical operation on the search result, for example, tapping, playback, and collection. Alternatively, the ranking rule is ranking the search result according to historical browsing data of the target user. For example, a click rate of the search result 1 by the target user in the target time period before a current moment is higher than that of the search result 2, and it is determined that the search result 1 is arranged before or above the search result 2. Alternatively, the ranking rule is another rule.

In steps s11 to s15, an implementation in which the server performs recognition processing on the multimedia data through each module to obtain the search tag associated with the multimedia data and the search result associated with the target tag may include: performing feature analysis processing on the multimedia data to obtain at least one key feature of the multimedia data; establishing a search tag corresponding to the at least one key feature; and then, performing search processing according to a target key feature to obtain the search result that corresponds to the target key feature and that is associated with the target tag. In a process of searching for, according to the target key feature, the search result associated with the target tag, search may be first performed for a result application object associated with the target key feature, and then a search resource corresponding to the result application object is determined as the search result associated with the target tag. That is, when the search result is determined, the result application object associated with the target key feature may be first determined, and then the search result is determined from the search resource corresponding to the result application object.

For example, it is assumed that the target key feature is of a first feature type or a second feature type, and the first feature type is different from the second feature type. In a case that the target key feature of the multimedia data is of the first feature type, search processing is performed based on the first feature type and the target key feature to obtain a search result corresponding to a result application object related to the first feature type; or in a case that the target key feature of the multimedia data is of the second feature type, search processing is performed based on the second feature type and the target key feature to obtain a search result corresponding to a result application object related to the second feature type. The result application object related to the first feature type and the result application object related to the second feature type are of different types.

In s16, the first client receives the result notification message returned by the server. In this case, the result notification message includes the search result associated with the target tag. The first client displays, in the second region of the resource search interface according to the result notification message, the search result associated with the target tag.

In s17, the first client calls, in a case that there is a trigger operation for a target search result, a result application object corresponding to the target search result to display search information of the target search result, the target search result being any one of the at least one search result displayed in the second region.

In summary, in this embodiment of this application, searching for the multimedia data may be triggered on the service interface according to interaction between the first client and the server, to obtain the search result associated with the multimedia data. This shortens a search path, and improves search efficiency.

Figure 11C:
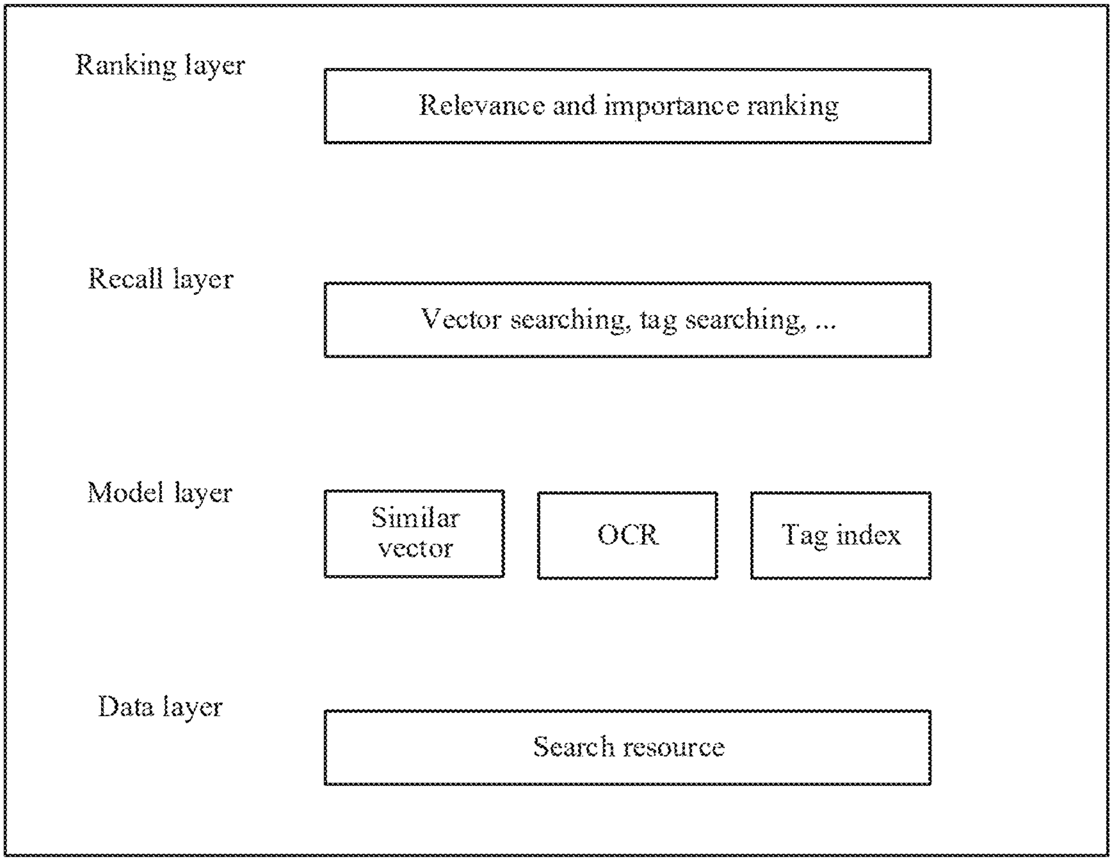
FIG. 11*c* is a schematic diagram of an architecture of a recognition algorithm according to some embodiments of this application.

In the embodiment shown in FIG. 11*a* and FIG. 11*b*, an example in which the data processing module includes the recognition interface and the encapsulated recognition algorithm is called through the recognition interface to perform recognition to obtain the search tag of the multimedia data is used. However, in the embodiments of this application, a self-built recognition algorithm is also supported. In this implementation, the data processing module of the server has a recognition function. That is, the data processing module is integrated with a recognition module, and may directly implement recognition of the multimedia data. FIG. 11*c* shows an exemplary self-built recognition algorithm framework. As shown in FIG. 11*c*, the recognition algorithm framework may include, from bottom to top, a data layer, a model layer, a recall layer, and a ranking layer. The data layer may be configured to obtain the search resource uploaded by the provider of the result application object (or the user logging on to the result application object). The model layer may be configured to perform recognition processing on the obtained search resource to obtain a tag associated with each search resource, and associatively store the search resource and the tag associated with the search resource. Specifically, the model layer may include a plurality of recognition algorithms (for example, a similar vector (ResNet) algorithm and an optical character recognition (OCR) algorithm). Therefore, the model layer may recognize the search resource by using one or more of the plurality of recognition algorithms. Certainly, when obtaining the to-be-recognized multimedia data, the model layer may perform recognition processing on the multimedia data by using the recognition algorithm to obtain the search tag associated with the multimedia data. The recall layer may be configured to recall, according to the target tag, the search result associated with the target tag. The ranking layer may be configured to perform, according to the ranking sequence, ranking processing on the plurality of search results associated with the target tag. The ranking rule herein may include one or more of the following: a learning to rank (L2R) relevance, importance, and the like. Alternatively, the ranking rule may refer to the related content described above.

For different types of multimedia data, different recognition algorithms are built to recognize the multimedia data. For example, if the multimedia data is an image, recognition processing may be performed on the image by using an image recognition algorithm to obtain a search tag associated with the image. The image recognition algorithm may be an algorithm that is obtained through training based on an AI technology such as deep learning and massive training data and that provides an image recognition service.

In this embodiment of this application, the encapsulated recognition algorithm may be called through the recognition interface to recognize the multimedia data, or the multimedia data may be recognized by using the self-built recognition algorithm, so that methods for recognizing the multimedia data are enriched. In addition, in this embodiment of this application, the search operation may be triggered for the multimedia data on the service interface, and the at least one search tag associated with the multimedia data and the search result associated with the target tag may be displayed on the resource search interface. Directly performing the search operation for the multimedia data displayed on the service interface to obtain the search tag associated with the multimedia data and the search result associated with the target tag simplifies a search process of the multimedia data, shortens a search path, and improves search efficiency.

The foregoing describes the method of the embodiments of this application in detail. For case of implementing the foregoing solution of the embodiments of this application, correspondingly, the following provides an apparatus of the embodiments of this application.

Figure 12:
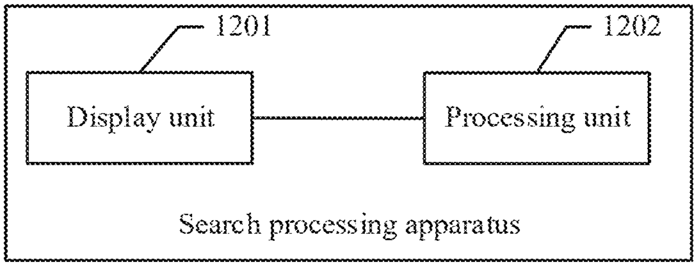
FIG. 12 is a schematic diagram of a structure of a search processing apparatus according to an embodiment of this application.

FIG. 12 is a schematic diagram of a structure of a search processing apparatus according to an exemplary embodiment of this application. The search processing apparatus may be a computer program (including program code) run in a target terminal. For example, the search processing apparatus may be a target application program (for example, an IM application program) in the target terminal. The search processing apparatus may be configured to perform some or all steps in the method embodiments shown in FIG. 2 and FIG. 6. Refer to FIG. 12. The search processing apparatus includes the following units:

a display unit 1201, configured to display multimedia data on a service interface; and a processing unit 1202, configured to display a resource search interface in response to a search operation on the multimedia data in a service interface, the resource search interface including a result display region for displaying a search result, and the result display region including a first region and a second region.

The display unit 1201 is further configured to display, in the first region, at least one search tag associated with the multimedia data.

The processing unit 1202 is further configured to display, in the second region in response to a selection operation on a target tag of the at least one search tag displayed in the first region, a search result associated with the target tag.

In an implementation, the service interface is a social conversation interface. The social conversation interface includes the multimedia data displayed in a social conversation message form.

When configured to display the resource search interface in response to the search operation on the multimedia data in a service interface, the processing unit 1202 is specifically configured to:

display an option bar on the social conversation interface in response to a trigger event for the multimedia data on the social conversation interface, the option bar including a search option; and determine, in response to detecting a selection operation on the search option, that the search operation for the multimedia data is triggered, and display the resource search interface.

In an implementation, the multimedia data includes general information of the multimedia data. When configured to display the multimedia data on the service interface, the processing unit 1202 is specifically configured to:

display the general information of the multimedia data on the service interface.

In an implementation, the service interface is a content display interface. The content display interface includes a search control.

When configured to display the resource search interface in response to the search operation on the multimedia data in a service interface, the processing unit 1202 is specifically configured to:

display a sharing window in response to a selection operation on the search control on the content display interface, the sharing window including a search option; and determine, in response to detecting a selection operation on the search option, that the search operation for the multimedia data is triggered, and display the resource search interface.

In an implementation, the multimedia data includes data content of the multimedia data. When configured to display the multimedia data on the service interface, the processing unit 1202 is specifically configured to:

display the data content of the multimedia data on the content display interface.

In an implementation, the processing unit 1202 is further configured to:

display a search object window in response to the search operation on the multimedia data in a service interface, the search object window including an object identifier of at least one search application object; and determine, in response to a selection operation performed in the search object window, M target object identifiers in the object identifier of the at least one search application object, M being a positive integer, and trigger search application objects indicated by the M target object identifiers to perform search processing.

Search results of search application objects indicated by N target object identifiers are displayed on the resource search interface. N is a positive integer less than or equal to M.

In an implementation, each of the at least one search tag displayed in the first region corresponds to a search application object indicated by one of the M target object identifiers. Search application objects indicated by different target object identifiers in the M target object identifiers correspond to different search tags.

In an implementation, the processing unit 1202 is further configured to:

trigger, in response to a selection operation on a target search result in the search result displayed in the second region, a result application object corresponding to the target search result to display search information of the target search result.

The search result displayed in the second region includes result prompt information and an application object identifier of a result application object corresponding to the result prompt information.

In an implementation, the processing unit 1202 is further configured to:

display a sharing control in a case that the result application object displays the search information of the target search result;

obtain, in response to a sharing operation triggered through the sharing control, a search identifier corresponding to the target search result, the search identifier being used for uniquely identifying the target search result, and the search identifier including a link of the target search result; and perform sharing processing on the search identifier.

In an implementation, the processing unit 1202 is further configured to:

perform feature analysis processing on the multimedia data to obtain at least one key feature of the multimedia data;

establish a search tag corresponding to the at least one key feature; and perform search processing according to a target key feature to obtain the search result associated with the target tag, the target key feature corresponding to the target tag.

In an implementation, the target key feature is of a first feature type or a second feature type, and the first feature type is different from the second feature type.

The processing unit 1202 is further configured to:

perform, in a case that the target key feature of the multimedia data is of the first feature type, search processing based on the first feature type and the target key feature to obtain a search result corresponding to a result application object related to the first feature type; or perform, in a case that the target key feature of the multimedia data is of the second feature type, search processing based on the second feature type and the target key feature to obtain a search result corresponding to a result application object related to the second feature type.

The result application object related to the first feature type and the result application object related to the second feature type are of different types.

In this embodiment of this application, the processing unit 1202 responds to the search operation on the multimedia data in a service interface, such that the display unit 1201 displays the resource search interface. The at least one search tag associated with the multimedia data and the search result associated with the target tag are displayed on the resource search interface. In the foregoing solution, the search operation may be directly triggered for the multimedia data displayed on the service interface to obtain the search tag associated with the multimedia data and the search result associated with the target tag. This simplifies a search process of the multimedia data, shortens a search path, and improves the search efficiency.

Figure 13:
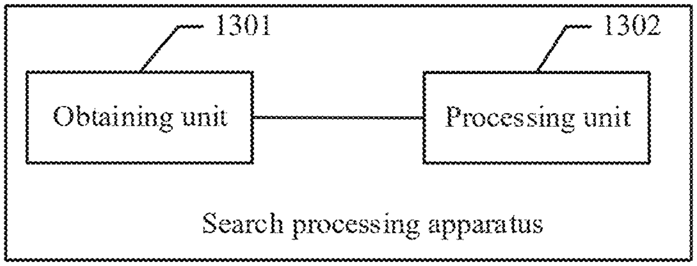
FIG. 13 is a schematic diagram of a structure of a search processing apparatus according to an embodiment of this application.

FIG. 13 is a schematic diagram of a structure of a search processing apparatus according to an exemplary embodiment of this application. The search processing apparatus may be run in a server. The search processing apparatus may be configured to perform some or all steps in the method embodiment shown in FIG. 11*b*. Refer to FIG. 13. The search processing apparatus includes the following units:

an obtaining unit 1301, configured to obtain a data processing request, the data processing request carrying to-be-processed multimedia data; and a processing unit 1302, configured to perform recognition processing on the multimedia data to obtain at least one search tag associated with the multimedia data.

The processing unit 1302 is configured to generate a response notification message based on the at least one search tag, the response notification message including the at least one search tag.

The processing unit 1302 is configured to transmit the response notification message, the response notification message being used for triggering a first client to display, in a first region of a resource search interface, the at least one search tag associated with the multimedia data.

In an implementation, the processing unit 1302 is further configured to:

receive a search request, the search request including a target tag, and the target tag being a search tag selected by performing a selection operation on the at least one search tag;

perform search processing according to the target tag to obtain a search result associated with the target tag; and generate a result notification message based on the search result associated with the target tag.

The result notification message is used for triggering the first client to display, in a second region of the resource search interface, the search result associated with the target tag.

In an implementation, the response notification message further includes a search result associated with a target tag in the at least one search tag. The response notification message is further used for triggering the first client to display, in a second region of the resource search interface, the search result associated with the target tag.

In an implementation, the server includes a search service module, a result recall module, and a data processing module. The processing unit 1302 is further configured to:

transmit, through the search service module, the multimedia data to the data processing module in response to the data processing request;

perform, by using the data processing module, recognition processing on the multimedia data to obtain the at least one search tag associated with the multimedia data; and perform, through the result recall module, search processing according to the target tag to obtain the search result associated with the target tag.

In an implementation, the server includes an off-line processing module and an index module. The processing unit 1302 is further configured to:

receive a to-be-stored search resource, the search resource being provided by a provider of a result application object; transmit the search resource to the data processing module through the off-line processing module, the data processing module being configured to perform recognition processing on the multimedia data to obtain the at least one search tag associated with the multimedia data;

perform recognition processing on the received search resource by using the data processing module to obtain a search tag associated with the search resource, and return the search tag associated with the search resource to the off-line processing module;

transmit the search tag associated with the search resource and the search resource to the index module through the off-line processing module; and store the search tag associated with the search resource and the search resource associatively by using the index module.

According to an embodiment of this application, each unit in the search processing apparatuses shown in FIG. 12 and FIG. 13 may exist respectively or be combined into one or more other units. Alternatively, a certain (or some) unit in the units may be further split into a plurality of smaller function units, thereby implementing the same operations without affecting the technical effects of the embodiments of this application. The units are divided based on logical functions. In actual applications, a function of one unit may be realized by multiple units, or functions of a plurality of units may be realized by one unit. In another embodiment of this application, the search processing apparatus may further include other units. In actual applications, these functions may also be realized cooperatively by the other units, and may be realized cooperatively by multiple units. According to another embodiment of this application, a computer program (including program code) capable of performing each step involved in the corresponding method shown in FIG. 11*b* may be run in a general-purpose computing device, for example, a computer, including a processing element and a storage element, for example, a central processing unit (CPU), a random access memory (RAM), or a read-only memory (ROM), to structure the search processing apparatus shown in FIG. 12 or FIG. 13 and implement the search processing method in the embodiments of this application. The computer program may be recorded in, for example, a non-transitory computer-readable recording medium and loaded, through the computer-readable recording medium, and run in the computing device.

In this embodiment of this application, the search operation may be directly triggered for the multimedia data displayed on the service interface to obtain the search tag associated with the multimedia data and the search result associated with the target tag. This simplifies a search process of the multimedia data, shortens a search path, and improves the search efficiency.

Figure 14:
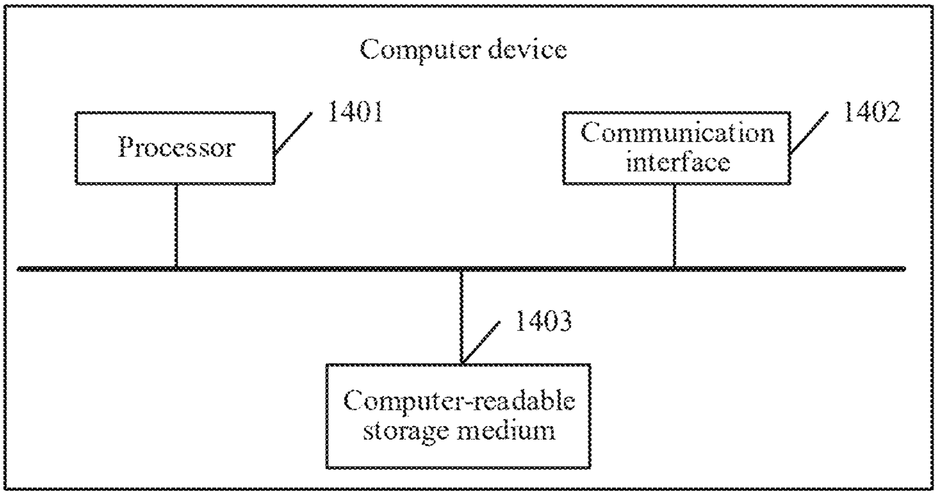
FIG. 14 is a schematic diagram of a structure of a computer device according to an embodiment of this application.

FIG. 14 is a schematic diagram of a structure of a computer device according to an exemplary embodiment of this application. Refer to FIG. 14. The computer device includes a processor 1401, a communication interface 1402, and a non-transitory computer-readable storage medium 1403. The processor 1401, the communication interface 1402, and the computer-readable storage medium 1403 may be connected through a bus or in another manner. The communication interface 1402 is configured to receive and send data. The computer-readable storage medium 1403 may be stored in a memory of the computer device. The computer-readable storage medium 1403 is configured to store a computer program. The computer program includes program instructions. The processor 1401 is configured to execute the program instructions stored in the computer-readable storage medium 1403. As a computing core and a control core of the computer device, the processor 1401 (or referred to as a CPU) is suitable for implementing one or more instructions, specifically suitable for loading and executing the one or more instructions, thereby implementing corresponding method processes or corresponding functions.

An embodiment of this application also provides a non-transitory computer-readable storage medium (memory). As a memory device in the computer device, the computer-readable storage medium is configured to store a program and data. It may be understood that the computer-readable storage medium herein may include a built-in storage medium in the computer device, or may certainly include an extended storage medium supported by the computer device. The computer-readable storage medium provides storage space storing a processing system of the computer device. Moreover, one or more instructions suitable for the processor 1401 to load and execute are also stored in the storage space, and these instructions may be one or more computer programs (including program code). The computer-readable storage medium herein may be a high-speed RAM, or a non-volatile memory, for example, at least one disk memory. In some embodiments, the computer-readable storage medium may be at least one computer-readable storage medium far away from the processor.

In an embodiment, the computer device may be the target terminal mentioned in the foregoing embodiments. One or more instructions are stored in the computer-readable storage medium. The processor 1401 loads and executes the one or more instructions stored in the computer-readable storage medium, so as to implement the corresponding steps in the embodiment of the search processing method. In specific implementations, the one or more instructions in the computer-readable storage medium are loaded and executed by the processor 1401 to implement any foregoing search processing method performed by the target terminal.

In another embodiment, the computer device may be the server mentioned in the foregoing embodiments. One or more instructions are stored in the computer-readable storage medium. The processor 1401 loads and executes the one or more instructions stored in the computer-readable storage medium, so as to implement the corresponding steps in the embodiment of the search processing method. In specific implementations, the one or more instructions in the computer-readable storage medium are loaded and executed by the processor 1401 to implement any foregoing search processing method performed by the server.

An embodiment of this application also provides a computer program product or computer program. The computer program product or computer program includes computer instructions. The computer instructions are stored in a computer-readable storage medium. A processor of a computer device reads the computer instructions from the computer-readable storage medium. The computer instructions are executed by the processor to implement the foregoing search processing method.

A person of ordinary skill in the art may realize that the units and the algorithm steps in each example described in combination with the embodiments disclosed in this application may be implemented by electronic hardware or a combination of computer software and electronic hardware. Whether these functions are executed by hardware or software depends on specific applications and design constraints of the technical solutions. A person skilled in the art may use different methods to implement the described functions for each particular application, but it is not to be considered that such implementation goes beyond the scope of this application.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on the computer, the processes or functions according to embodiments of this application are all or partially generated. The computer may be a general-purpose computer, a dedicated computer, a computer network, or another programmable device. The computer instruction may be stored in a computer-readable storage medium or transmitted through the computer-readable storage medium. The computer instruction may be transmitted from one website, computer, server, or data center to another in a wired (for example, a coaxial cable, an optical fiber, or a digital subscriber line (DSL)) or wireless (for example, infrared, radio, or microwave) manner. The computer-readable storage medium may be any available medium accessible by a computer, or a data storage device, such as a server or a data center, integrating one or more available media. The available medium may be a magnetic medium (for example, a floppy disk, a hard disk, or a magnetic tape), an optical medium (for example, a digital video disk (DVD)), a semiconductor medium (for example, a solid state disk (SSD)), or the like.

The foregoing descriptions are merely specific implementations of this application, but are not intended to limit the protection scope of this application. Any variation or replacement apparent to a person skilled in the art within the technical scope disclosed in this application shall fall within the protection scope of this application. Therefore, the protection scope of this application shall be subject to the protection scope of the claims.

In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit

What is claimed is:

1. A search processing method performed by a computer device, the method comprising:

displaying multimedia data in a conversation service interface;

receiving a search operation on the multimedia data in response to a user interaction with the multimedia data displayed in the conversation service interface;

in response to the search operation:

performing image recognition on the multimedia data to extract a plurality of search tags from the multimedia data;

displaying the plurality of search tags extracted from the multimedia data adjacent to the multimedia data in the conversation service interface;

in response to a user selection of one of the plurality of search tags as a target tag, initiating a search request, the search request including a keyword corresponding to the target tag; and displaying a search result interface in replacement of the conversation service interface, the search result interface including a search result associated with the target tag; and in response to a user selection of the search result, displaying the search result and the multimedia data in the conversation service interface in replacement of the search result interface, wherein the search result and the multimedia data are to be shared with a second user.

2. The method according to claim 1, wherein the multimedia data is displayed in the conversation service interface in form of a social conversation message transmitted from the second user.

3. The method according to claim 1, wherein the method further comprises:

before receiving the search operation on the multimedia data:

displaying an option bar on the conversation service interface in response to a trigger event for the multimedia data on the conversation service interface, the option bar comprising a search option; and determining, in response to detecting a selection operation on the search option, that the search operation for the multimedia data is triggered.

4. The method according to claim 1, wherein the method further comprises:

in response to the user selection of the search result, displaying a sharing window, the sharing window comprising the search result and the multimedia data and a sharing control; and in response to detecting a user selection of the sharing control, transmitting the search result and the multimedia data to the second user.

5. The method according to claim 1, wherein the method further comprises:

before displaying the search result interface:

displaying a search object window in response to the search operation on the multimedia data in the conversation service interface, the search object window comprising an object identifier of at least one search application object; and determining, in response to a selection operation performed in the search object window, M target object identifiers in the object identifier of the at least one search application object, M being a positive integer, and triggering search application objects indicated by the M target object identifiers to perform search processing, wherein search results of search application objects indicated by N target object identifiers is to be displayed on the search result interface, and N being a positive integer less than or equal to M.

6. The method according to claim 1, wherein the method further comprises:

in response to a user selection on a target search result in the search result interface, initiating a result application object corresponding to the target search result to display search information of the target search result, the search result displayed in the search result interface comprising result prompt information and an application object identifier of a result application object corresponding to the result prompt information.

7. The method according to claim 1, wherein the method further comprises:

before displaying the search result interface:

performing feature analysis on the multimedia data to obtain at least one key feature of the multimedia data;

establishing a search tag corresponding to the at least one key feature; and performing search processing according to a target key feature corresponding to the target tag to obtain the search result associated with the target tag.

8. A computer device, comprising:

a processor, configured to execute a computer program; and a computer-readable storage medium, the computer-readable storage medium storing the computer program that, when executed by the processor, causes the computer device to implement a search processing method including:

displaying multimedia data in a conversation service interface;

receiving a search operation on the multimedia data in response to a user interaction with the multimedia data displayed in the conversation service interface;

in response to the search operation:

performing image recognition on the multimedia data to extract a plurality of search tags from the multimedia data;

displaying the plurality of search tags extracted from the multimedia data adjacent to the multimedia data in the conversation service interface;

in response to a user selection of one of the plurality of search tags as a target tag, initiating a search request, the search request including a keyword corresponding to the target tag; and displaying a search result interface in replacement of the conversation service interface, the search result interface including a search result associated with the target tag; and in response to a user selection of the search result, displaying the search result and the multimedia data in the conversation service interface in replacement of the search result interface, wherein the search result and the multimedia data are to be shared with a second user.

9. The computer device according to claim 8, wherein the multimedia data is displayed in the conversation service interface in form of a social conversation message transmitted from the second user.

10. The computer device according to claim 8, wherein the method further comprises:

before receiving the search operation on the multimedia data:

displaying an option bar on the conversation service interface in response to a trigger event for the multimedia data on the conversation service interface, the option bar comprising a search option; and determining, in response to detecting a selection operation on the search option, that the search operation for the multimedia data is triggered.

11. The computer device according to claim 8, wherein the method further comprises:

in response to the user selection of the search result, displaying a sharing window, the sharing window comprising the search result and the multimedia data and a sharing control; and in response to detecting a user selection of the sharing control, transmitting the search result and the multimedia data to the second user.

12. The computer device according to claim 8, wherein the method further comprises:

before displaying the search result interface:

displaying a search object window in response to the search operation on the multimedia data in the conversation service interface, the search object window comprising an object identifier of at least one search application object; and determining, in response to a selection operation performed in the search object window, M target object identifiers in the object identifier of the at least one search application object, M being a positive integer, and triggering search application objects indicated by the M target object identifiers to perform search processing, wherein search results of search application objects indicated by N target object identifiers is to be displayed on the search result interface, and N being a positive integer less than or equal to M.

13. The computer device according to claim 8, wherein the method further comprises:

in response to a user selection on a target search result in the search result interface, initiating a result application object corresponding to the target search result to display search information of the target search result, the search result displayed in the search result interface comprising result prompt information and an application object identifier of a result application object corresponding to the result prompt information.

14. The computer device according to claim 8, wherein the method further comprises:

before displaying the search result interface:

performing feature analysis on the multimedia data to obtain at least one key feature of the multimedia data;

establishing a search tag corresponding to the at least one key feature; and performing search processing according to a target key feature corresponding to the target tag to obtain the search result associated with the target tag.

15. A non-transitory computer-readable storage medium storing a computer program that, when executed by a processor of a computer device, causes the computer device to implement a search processing method including:

displaying multimedia data in a conversation service interface;

receiving a search operation on the multimedia data in response to a user interaction with the multimedia data displayed in the conversation service interface;

in response to the search operation:

performing image recognition on the multimedia data to extract a plurality of search tags from the multimedia data;

displaying the plurality of search tags extracted from the multimedia data adjacent to the multimedia data in the conversation service interface;

in response to a user selection of one of the plurality of search tags as a target tag, initiating a search request, the search request including a keyword corresponding to the target tag; and displaying a search result interface in replacement of the conversation service interface, the search result interface including a search result associated with the target tag; and in response to a user selection of the search result, displaying the search result and the multimedia data in the conversation service interface in replacement of the search result interface, wherein the search result and the multimedia data are to be shared with a second user.

16. The non-transitory computer-readable storage medium according to claim 15, wherein the multimedia data is displayed in the conversation service interface in form of a social conversation message transmitted from the second user.

17. The non-transitory computer-readable storage medium according to claim 15, wherein the method further comprises:

before receiving the search operation on the multimedia data:

displaying an option bar on the conversation service interface in response to a trigger event for the multimedia data on the conversation service interface, the option bar comprising a search option; and determining, in response to detecting a selection operation on the search option, that the search operation for the multimedia data is triggered.

18. The non-transitory computer-readable storage medium according to claim 15, wherein the method further comprises:

in response to the user selection of the search result, displaying a sharing window, the sharing window comprising the search result and the multimedia data and a sharing control; and in response to detecting a user selection of the sharing control, transmitting the search result and the multimedia data to the second user.

19. The non-transitory computer-readable storage medium according to claim 15, wherein the method further comprises:

in response to a user selection on a target search result in the search result interface, initiating a result application object corresponding to the target search result to display search information of the target search result, the search result displayed in the search result interface comprising result prompt information and an application object identifier of a result application object corresponding to the result prompt information.

20. The non-transitory computer-readable storage medium according to claim 15, wherein the method further comprises:

before displaying the search result interface:

performing feature analysis on the multimedia data to obtain at least one key feature of the multimedia data;

establishing a search tag corresponding to the at least one key feature; and performing search processing according to a target key feature corresponding to the target tag to obtain the search result associated with the target tag.

* * * * *